United States Patent
Mashita et al.

(10) Patent No.: US 6,824,730 B2
(45) Date of Patent: Nov. 30, 2004

(54) RESIN COMPOSITION, GASKET MATERIAL AND GASKET INTEGRATED WITH METAL

(75) Inventors: Naruhiko Mashita, Kanagawa-ken (JP); Shinichi Toyosawa, Saitama-ken (JP); Youichi Nishimuro, Tokyo (JP); Yasushi Imai, Kanagawa-ken (JP); Tadashi Utsunomiya, Kanagawa-ken (JP); Ichiro Akasaka, Tokyo (JP); Youkou Saito, Kanagawa-ken (JP)

(73) Assignee: Bridgestone Corporation, Tokyo (JP)

( * ) Notice: Subject to any disclaimer, the term of this patent is extended or adjusted under 35 U.S.C. 154(b) by 286 days.

(21) Appl. No.: 09/784,415

(22) Filed: Feb. 14, 2001

(65) Prior Publication Data

US 2001/0018490 A1 Aug. 30, 2001

(30) Foreign Application Priority Data

| Feb. 15, 2000 | (JP) | 2000-036183 |
| Feb. 15, 2000 | (JP) | 2000-036184 |
| Mar. 2, 2000 | (JP) | 2000-056744 |
| Mar. 2, 2000 | (JP) | 2000-056941 |
| Mar. 10, 2000 | (JP) | 2000-066201 |
| Mar. 10, 2000 | (JP) | 2000-066202 |
| May 2, 2000 | (JP) | 2000-133118 |

(51) Int. Cl.$^7$ .................. C08L 53/00; C08L 51/00; B32B 27/00
(52) U.S. Cl. ............... 264/480; 428/461; 428/462; 264/483; 525/71
(58) Field of Search ............... 264/480, 483; 428/461, 462, 457; 525/71

(56) References Cited

U.S. PATENT DOCUMENTS

| 4,241,129 A | * | 12/1980 | Marton et al. | 428/216 |
| 5,250,349 A | * | 10/1993 | Nakagawa et al. | 428/212 |
| 5,384,994 A | * | 1/1995 | Borba | |
| 5,869,555 A | * | 2/1999 | Simmons et al. | |
| 6,239,217 B1 | * | 5/2001 | Bank et al. | |

* cited by examiner

Primary Examiner—Jeffrey Mullis
(74) Attorney, Agent, or Firm—Oblon, Spivak, McClelland, Maier & Neustadt, P.C.

(57) ABSTRACT

There are disclosed a resin composition which is excellent in rubber elasticity, oil maintainability and adhesivity to a metal, and comprises a thermoplastic elastomer composition comprising a (a1) hydrogenated block copolymer which is obtained by hydrogenating a block copolymer consisting essentially of a polymer block composed principally of a vinyl aromatic compound and a polymer block composed principally of a conjugated diene compound, which has a weight average molecular weight of at least 200,000, in which the polymer block composed principally of a vinyl aromatic compound is polystyrene, and in which the content by weight of the polystyrene moiety contained in the hydrogenated block copolymer is 20 to 40%; a (b1) non-aromatic rubber-softening agent having a kinematic viscosity at 40° C. of at least 300 mm$^2$s$^{-1}$; and a (c1) modified polyolefinic resin, the resin composition having a hardness according to JIS K6253 of at most 50 degrees and a compression set according to JIS K6262 of at most 50%; a composite molded body of a metal and the thermo-plastic elastomer composition such as a gasket integrated with a metallic sheet; and processes for producing the above products.

37 Claims, 3 Drawing Sheets

RESIN COMPOSITION, GASKET MATERIAL AND GASKET INTEGRATED WITH METAL

BACKGROUND OF THE INVENTION

1. Field of the Invention

The present invention relates to a resin composition which has such performances as excellent rubber elasticity, favorable oil maintainability, low hardness and low compression set, has excellent adhesivity to a metal, and is well suited as a gasket material for use in a gasket integrated with a metal wherein a gasket is integrated into a metallic cover body or a metallic frame body.

In addition, the present invention pertains to a composite molded body in which a metallic sheet and a thermoplastic elastomer are integrated with each other, more particularly to a composite molded body in which a metallic sheet and a thermoplastic elastomer are integrated with each other without being subjected to surface treatment or without the use of an adhesive and which is well suited for use in a gasket fitted to a cover, etc. that is employed for housing electronic equipment and the like.

Moreover, the present invention is related to a process for producing a composite molded body of a resin and metal, for instance, a gasket integrated with a metal which has excellent adhesivity between a metallic part and a resin portion formed by injection molding of a thermoplastic elastomer composition.

Further, the present invention is concerned with a process for producing a gasket integrated with a cover having excellent gasket performance by injection molding of a thermoplastic elastomer composition.

2. Description of the Related Arts

In recent years, electronic equipment such as a computer has come to have intricate circuit constitution, accompanying the progress towards a high performance and compactification, and is prone to be readily damaged even by a slight amount of dust. Accordingly, dust prevention is increasingly required in practical application, thus making it a general practice to prevent dust penetration by the use of a gasket.

The above-mentioned gasket is, in many cases, in the form of a gasket integrated with a metal in which a gasket material composed of a thermoplastic elastomer of low hardness has been injection molded onto a metallic part such as a case lid.

The methods as described hereunder have heretofore been adopted as a method for integrating a thermoplastic elastomer of low hardness with a metallic part.

① a method which comprises fixing a gasket to a cover body by means of a double-coated tape;

② a method which comprises sandwiching a cover body having holes between gasket materials through the holes;

③ a method which comprises applying in advance, an adhesive to the surface portion of a metallic part onto which an elastomer is to be injection molded or extrusion molded; and ④ a method which comprises making in advance, through holes or grooves on the portion of a metallic part onto which an elastomer is to be injection molded so as to latch the injection molded portion.

However, any of the above-mentioned methods is complicated in production steps, and thus needs a high production cost. As the above-mentioned method ① which comprises fixing a gasket to a cover body by means of a double-coated tape, there is usually adopted a method in which a sheet-like gasket material to which a double-coated tape is adhered, is punched into a shape of gasket, and the resultant gasket is fixed to the cover body. However, the aforesaid method is involved in such problems that the production process is made intricate or troublesome, thus constituting a factor increasing the production cost, since most of the sheet-like gasket material after punching remains as waste material and besides, the gasket is fixed to the cover body after the gasket material has been punched into a shape of gasket.

In addition, in the gasket fitted to a cover body which is produced by the above-mentioned method ② which comprises sandwiching a cover body having holes between gasket materials through the holes, since the gasket material is exposed on the upper side of the cover body and besides is insufficiently adhered to the cover body, the gasket material exposed thereon is sometimes upturned or curled when the cover body is inserted into the space of an electronic equipment main body, which space has been narrowed accompanying the recently compactified electronic equipment part items. Thus, there is caused the problem that such upturning or curling is responsible for defective sealing properties.

Moreover, in the case where the gasket which is fitted to a cover body and which is produced by such a method is used in a hard disc drive apparatus, there is caused the problem that it is impossible to suppress the vibration due to the rotation of the hard disc.

In general, the adhesion between a thermoplastic elastomer and a metallic sheet is carried out by a method in which the metallic sheet is subjected to a surface treatment, and the treated surface is coated with an adhesive to be adhered to the thermoplastic elastomer. In order to enhance the adhesivity, there is also carried out blending of an adhesive (a pressure sensitive adhesive) material in the thermoplastic elastomer.

However, the adhesion between the thermoplastic elastomer and the metallic sheet by the use of an adhesive is involved in such problems that its production process becomes intricate and troublesome, constituting a factor increasing the production cost, since the process requires the steps of surface treatment for a metallic sheet and adhesive coating.

In the case of using, in precision electronic equipment and the like, a molded body in the form of a gasket fitted to a cover body wherein a thermoplastic elastomer is adhered to a metallic sheet, there is caused a problem of gas generation due to the surface treatment and adhesive coating, thereby making it difficult to use the precision electronic equipment. Further in the case of blending an adhesive (a pressure sensitive adhesive) material in a thermoplastic elastomer, there are caused such problems in that the tacking (pressure sensitive self adhesion) imparted to the resultant blend makes handling itself extremely difficult and also in that the blending of the adhesive (a pressure sensitive adhesive) material deteriorates the physical properties such as the compression set of a thermoplastic elastomer, whereby the elastomer no longer functions as a gasket material.

On the one hand, as a method for laminating a thermoplastic resin on a metallic sheet, there is described in Japanese Patent Application Laid Open Nos. 235783/1999 (Heisei 11) and 262978/1999 (Heisei 11), an integration method in which a polyolefin film side, that is, the resin side is subjected to a corona treatment and laminated with a metallic sheet. Methods for integrally molding a styrenic thermoplastic elastomer and poly-propylene by injection molding are described in Japanese Patent Application Laid Open Nos. 139232/1990 (Heisei 2), 99331/1996 (Heisei 8) and 266375/1995 (Heisei 7).

Nevertheless, according to single use of any of the above-stated methods, the resultant molded body does not function at all as a gasket fitted to a cover body. Saying it differently, a metallic sheet laminated with a thermoplastic resin film, even if the film thickness is extremely increased, does not function at all as a gasket by the single use of a rigid resin film. In addition, it is absolutely impossible to expect that a composite material formed by integrally injection molding a styrenic elastomer and polypropylene will function as a cover body because of the low rigidity of polypropylene as the substrate.

In the case of producing a gasket integrated with a metal by a method wherein a gasket portion is formed by injection molding or extrusion molding a thermoplastic elastomer onto the surface of a metallic cover body, the direction of the injection molding or extrusion molding for the thermoplastic elastomer has usually been the direction towards a butt contact surface on the gasket portion upon the use thereof (the surface of the gasket for the purpose of realizing hermetical sealing by coming into butt contact with a vessel body at the time of its use; hereinafter sometimes referred to simply as "butt contact surface").

However, the following disadvantages have been involved in the above-mentioned case.

① When there is installed a spout for injection molding or extrusion molding a thermoplastic elastomer separately from the gasket portion, a space therefor is made necessary, thus causing restriction on gasket design.

② When there is installed a spout on the butt contact surface for the time of its use to avoid the space problem, there is a fear of losing flatness of the gasket and causing defect of gasket performance.

③ When an attempt is made to dispose a gasket rubber portion as close as the end of a metallic cover surface, it is necessary to locate an injection molding port also as close as the end. However, such location is difficult from the aspect of design, since in many cases, the end portion of a metallic cover is bent to the gasket location side for the purpose of assuring the rigidity of the cover. Saying it differently, the injection molding port of an injection molding machine interferes with the bending part of the metallic cover end. Therefore, the gasket rubber portion can not easily be located as close as the end portion of a metallic cover surface.

SUMMARY OF THE INVENTION

Under such circumstances, it is a general object of the present invention to provide a resin composition which has such performances that are required as a gasket material including excellent rubber elasticity, favorable oil maintainability, low hardness, excellent seating properties and low compression set, which has excellent adhesivity to a metal, and which is well suited as a gasket material for use in a gasket integrated with a metal.

It is another object of the present invention to provide a composite molded body which can be produced dispensing with an intricate or troublesome step, which is excellent in vibration damping properties, and which is well suited for use in a gasket fitted to a cover body.

It is still another object of the present invention to provide a process for producing a composite molded body of a resin and metal in which the resin portion and the metallic portion are sufficiently adhesively fixed to each other not through an intricate production step.

It is a further object of the present invention to provide a process for producing a gasket integrated with a metal so as not to cause a defect of gasket performance due to restriction on the gasket design or the loss of flatness of a gasket face.

Other objects of the present invention will be obvious from the text of the specification hereinafter disclosed.

A proposal was previously made by the present inventors on a gasket material which is composed of a hydrogenated block copolymer, a non-aromatic rubber-softening agent and a polyolefinic resin each having specific physical properties at specific proportions, and which has excellent rubber elasticity, good oil maintainability, low hardness, excellent seating properties and low compression set {Japanese Patent Application Laid Open No. 344879/1999 (Heisei 11)}. In addition, intensive extensive research and investigation were accumulated by the present inventors in order to attain the above-mentioned objects. As a result, it has been found that the objects thereof can be achieved by combinationally employing the hydrogenated block copolymer in the above-mentioned invention as a prior art and a modified hydrogenated block copolymer.

It has also been found that the objects thereof can be achieved by the composite molded body which is formed by laminating a metallic sheet with a specific thermoplastic resin, and then integrating a specific thermoplastic elastomer with the laminate thus obtained.

It has further been found that the objects thereof can be achieved by subjecting part or all of the surface of a metallic part that comes into contact with a resin portion to a corona treatment or a plasma treatment, and thereafter placing the metal-resin laminate in a mold.

It has still further been found that the objects thereof can be achieved by injection casting a thermoplastic elastomer composition into a mold from the direction different from the butt contact surface of a gasket portion. It being so, the present invention has been accomplished on the basis of the above-mentioned findings and information.

Specifically, the present invention provides a resin composition which comprises a thermoplastic elastomer composition comprising 100 parts by weight of a (a1) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene, and in which the content by weight of the polystyrene moiety that is contained in the hydrogenated block copolymer is in the range of 20 to 40% 100 to 200 parts by weight of a (b1) non-aromatic rubber-softening agent having a kinematic viscosity at 40° C. of at least 300 mm$^2$s$^{-1}$; and 10 to 50 parts by weight of a (c1) modified polyolefinic resin, said resin composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%.

Moreover, the present invention provides a gasket material composed of the above-mentioned resin composition according to the present invention; a gasket integrated with a metal formed by molding by the use of the aforesaid gasket material; and a hard disc gasket composed of the gasket integrated with a metal as mentioned above.

In addition, the present invention provides a thermoplastic elastomer composition comprising 100 parts by weight of a (a2) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene and in which the content by weight of the polystyrene moiety that is contained in the hydrogenated block copolymer is in the range of 20 to 40%; 100 to 200 parts by weight of a (b2) non-aromatic rubber-softening agent having a kinematic viscosity at 40° C. of at least 300 $mm^2s^{-1}$; 10 to 50 parts by weight of a (c2) modified hydrogenated block copolymer obtained by hydrogenating a block copolymer in which a functional group is imparted to a block copolymer consisting essentially of at least one polymer block composed principally of a vinyl aromatic compound and at least one polymer block composed principally of a conjugated diene compound; and 0 to 20 parts by weight of a (d2) compound composed principally of a crystalline polyolefin, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%.

Also, the present invention provides a composite molded body that is formed by integrating through thermally fusing adhesion, a metallic sheet laminated with a thermoplastic resin having a hardness as measured in accordance with JIS K6253 with a durometer of type A being at least 50 degrees and a thermoplastic elastomer composition having a hardness as measured in accordance with JIS K6253 with a durometer of type A being at most 60 degrees and a compression set as measured in accordance with JIS K6262 after being allowed to stand at 70° C. under a compression ratio of 25% for 22 hours being at most 50%.

Further, the present invention provides a gasket material composed of the above-stated thermoplastic elastomer composition according to the present invention; and a gasket integrated with a metal formed by molding the aforesaid gasket material into a gasket integrated with a metallic cover or a gasket integrated with a metallic frame.

Still further, the present invention provides a process for producing a composite molded body of a resin and metal which comprises subjecting part or all of the surface of a metallic part that is supposed to come into contact with a resin portion to a corona treatment or a plasma treatment, thereafter placing the metallic part in a mold, and then injecting a thermoplastic elastomer composition onto the surfaces of the metallic part placed in the mold to form a resin portion.

Aside therefrom, an attempt to subject a resin side to a corona treatment for the purpose of enhancing the adhesivity to a metal is described, for instance, in Japanese Patent Application Laid Open Nos. 235787/1999 (Heisei 11) and 262978/1999 (Heisei 11), but a corona treatment or plasma treatment of a metal side has never hitherto been attempted at all.

Furthermore, the present invention provides a process for producing a gasket integrated with a cover body by placing a metallic cover body in a mold, and injecting a gasket material composed of a thermoplastic elastomer composition onto the surfaces of said cover body so as to form a gasket portion, characterized in that the thermoplastic elastomer composition is injection cast from the direction different from the direction towards a butt contact surface on the gasket portion upon the use thereof.

DESCRIPTION OF THE PREFERRED EMBODIMENTS

Figure 1:
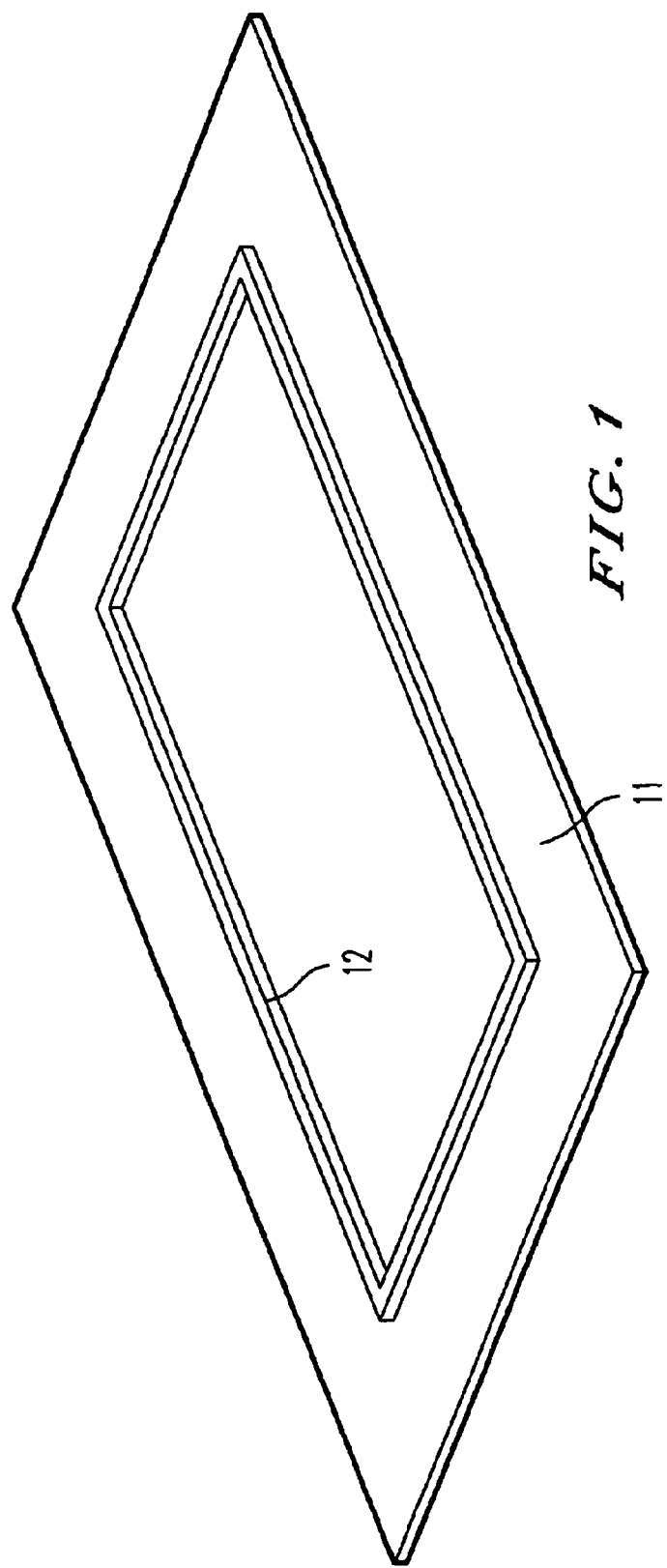
FIG. 1 is a perspective illustration which shows a gasket integrated with a metal according to the present invention, wherein the symbols 11 and 12 denote a cover body and a gasket, respectively.

The hydrogenated block copolymer as the component (a1) in the a resin composition according to the present invention is a hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene and in which the content by weight of the polystyrene moiety that is contained in the hydrogenated block copolymer is in the range of 20 to 40%. The hydrogenated block copolymer as the component (a1) is obtainable, for instance, by hydrogenating polybutadiene-polystyrene block copolymer and polyisoprene-polystyrene block copolymer, or block copolymer of polybutadiene or ethylene-butadiene random copolymer and polystyrene. Of these is particularly preferable a hydrogenated block copolymer obtainable by hydrogenating styrene-butadiene-styrene block copolymer, styrene-isoprene-styrene block copolymer or styrene-butadiene/isoprene-styrene block copolymer.

The hydrogenated block copolymer as the component (a1) is specifically exemplified by crystalline polyethylene-polystyrene block copolymer, styrene-ethylene/butylene-styrene triblock copolymer (SEBS), styrene-ethylene/propylene-styrene triblock copolymer (SEPS), styrene-ethylenepropylene/ethylenebutyrene-styrene block copolymer and the like copolymer. Of these are particularly preferable SEBS, SEPS and styrene-ethylenepropylene/ethylenebutylene-styrene block copolymer.

The hydrogenated block copolymer has a weight average molecular weight of at least 200,000, preferably 400,000 to 700,000 in particular. The weight average molecular weight, when being less than 200,000, brings about such disadvantage that marked bleed of a softening agent and a high compression set make the copolymer unendurable to practical use.

The content of the (non-crystalline) styrene block in the above-mentioned hydrogenated block copolymer is in the range of 20 to 40% by weight. The content thereof, when being less than 20% by weight, results in unreasonably high compression set, whereas the content, when being more than 40% by weight, leads to unreasonably high hardness.

The (non-crystalline) styrene block has a glass transition temperature of 60° C. or higher, preferably 80° C. or higher. The polymer at the portions which connect the non-crystalline styrene block at both ends is also preferably non-crystalline, and is exemplified by the hydrogenated product of ethylene-butylene copolymer, butadiene polymer, isoprene polymer or the like. It may be the block copolymer or random copolymer of any of the above-exemplified polymer.

Any of the above-mentioned hydrogenated block copolymers is used usually alone, but may be used in combination with at least one other in the form of a blend. In particular, the fluidity of the copolymer upon molding can be improved by blending at least two types thereof different in molecular weight or styrene content from one another. The hydrogenated block copolymers are readily available from the marketed products such as Septon (trade name, manufactured by Kuraray Co.,Ltd.), Krayton G (trade name, manufactured by Shell Chemical Co. ,Ltd.), Tuftec (trade name, manufactured by Asahi Chemical Industry Co., Ltd.) and the like.

The above-mentioned non-aromatic rubber-softening agent as the component (b1) in the resin composition according to the present invention is blended for the purpose of lowering the hardness of the resin composition, and has a kinematic viscosity at 40° C. of at least 300 $mm^2s^{-1}$.

The kinematic viscosity at 40° C. of the softening agent, when being lower than 300 $mm^2s^{-1}$, brings about such disadvantage that marked weight loss of the composition due to volatilization and marked bleed of a softening agent render the copolymer unendurable to practical use. From the viewpoints of practical application and production process, the kinematic viscosity at 40° C. thereof is in the range of preferably 300 to 10,000 $mm^2s^{-1}$, particularly preferably 300 to 5,000 $mm^2s^{-1}$. Moreover the weight average molecular weight thereof is at most 20,000, preferably at most 10,000, particularly preferably at most 5,000. Preferably usable softening agent is usually liquid or in the form of liquid at room temperature.

The softening agent having such properties may be properly optionally selected for use from a variety of non-aromatic rubber-softening agents, for instance, of mineral oil base, vegetable oil base, synthetic oil base, etc. The mineral oil base is exemplified by process oil such as naphthene base and paraffin base. The vegetable mineral oil base is exemplified by castor oil, cotton seed oil, linseed oil, rapeseed oil, soybean oil, palm oil, coconut oil, peanut oil, Japan wax, pine seed oil and olive oil. Preferably, the softening agent comprises at least one or two species selected from mineral oil base such as paraffin base oil and naphthene base oil and synthetic oil base such as polyisobutylene base oil, and also has a weight average molecular weight in the range of 450 to 5,000. Any of the above exemplified softening agent may be used alone or in combination with at least one other in the form of mixture.

The blending amount of the softening agent is 100 to 200 parts by weight based on 100 parts by weight of the aforesaid component (a1), preferably 100 to 150 parts by weight based thereon. The blending amount thereof, when being less than 100 parts by weight, causes a fear of insufficient flexibility of the thermoplastic material, whereas the amount, when being more than 200 parts by weight, gives rise to liability to bleeding of the softening agent and a cause of deteriorating the mechanical strength of the thermoplastic material. Preferably, the blending amount thereof is properly optionally selected within the above-mentioned range in accordance with the molecular weight of the hydrogenated block copolymer as the component (a1) and the types of other components to be incorporated therein.

Any of the softening agents is readily available from the marketed products such as Diana Process Oil Series (trade name, manufactured by Idemitsu Kosan Co., Ltd.), Sunbar Series and Sunsen Series(trade names, manufactured by Nippon Oil Co., Ltd.), Lucant Series(trade name, manufactured by Mitsui Chemicals Inc.) and the like.

The above-mentioned modified polyolefinic resin as the component (c1) in the resin composition according to the present invention is blended for the purpose of enhancing workability, heat resistant characteristics and adhesivity to a metal.

The polyolefinic resin to be modified is preferably a resin composed principally of polypropylene, and is exemplified by isotactic polypropylene and a copolymer of propylene and a small amount of an other olefin (e.g. propylene-ethylene copolymer and propylene/4-methyl-1-pentene copolymer). In the case of using isotactic polypropylene copolymer as a polyolefinic resin, there is preferably usable the aforesaid copolymer having an MFR { as measured in accordance with JIS K7210 at 230° C. under a load of 2.16 kg (21.2 N)} being at least 0.1 g/10 minutes, particularly at least 0.5 g/10 minutes.

The modified polyolefinic resin is formed by polymerizing such polyolefinic resin with a polymerizable compound having a functional group, and particularly preferably having a functional group which has an absorption band at a wave number in the range of 1500 to 2000 $cm^{-1}$ in its infrared absorption spectrum.

According to "High Polymer Analysis Handbook" (published from Kinokuniya Bookshop) which describes "Application to Qualitative Analysis" of infrared analysis for high polymer materials such as plastics and rubber, it has been turned out that there is a characteristic absorption band peculiar to each high polymer composition, and that there exists an absorption band characteristic of a functional group of a polymer in the range of 1550 to 1950 $cm^{-1}$ in its infrared absorption spectrum. For instance, it is described in the aforesaid Handbook that there appears an absorption assigned to a carbonyl group such as a ketone, an aldehyde and amine in the vicinity of 1700 $cm^{-1}$, an absorption assigned to an ester, an acid chloride and an acid anhydride in the vicinity of 1850 to 1725 $cm^{-1}$ that are higher wave number side, and an absorption band assigned to a dissociated carboxylic acid in the range of 1610 to 1550 $cm^{-1}$, specifically that there appears an absorption assigned and peculiar to a carbonyl group in the range of 1750 to 1720 $cm^{-1}$. In addition with regard to infrared absorption spectrum of maleic anhydride-grafted polypropylene, it is stated therein that there appears a stretching vibration assigned to C=O in maleic anhydride in the vicinity of 1785$cm^{-1}$ and 1860 $cm^{-1}$. On the one hand, there is no infrared absorption in this region (1550 to 1950 $cm^{-1}$) as to the infrared absorption spectrum of pure polypropylene as described in the Handbook.

As a result of intensive research and investigation made by the present inventors, it has been found that preferable modified polyolefinic resin as the component (c1) is that which has a functional group (maleic anhydride, acrylic acid, amides, carboxylic esters, etc.) having an absorption band in the region of 1500 to 2000 cm$^{-1}$.

The aforesaid functional group having an absorption band in the region of 1500 to 2000 cm$^{-1}$ is preferably in the form of an unsaturated carboxylic acid, particularly maleic anhydride, acrylic acid or the like, which exhibits favorable adhesivity as compared with an acid esters. The modified polyolefinic resin having such a functional group is available from the marketed products such as Nuculele Series (trade name, manufactured by Du pont-Mitsui Polychemicals Co, Ltd.), Youmex Series (trade name, manufactured by Sanyo Chemical Industries Ltd.), Exceler Series (trade name, manufactured by Exxon Chemical Japan Ltd.), Polybond Series (trade name, manufactured by UniRoyal Co, Ltd.), Admer Series (trade name, manufactured by Mitsui Chemicals Inc.) and the like.

The modification rate of the component (c1) {% by weight, parts by weight of a modifying agent to be used per 100 parts by weight of polypropylene} is preferably at least one (1) % by weight in order to assure sufficient adhesivity.

The blending amount of the component (c1) is 10 to 50 parts by weight based on 100 parts by weight of the above-mentioned component (a1), preferably 10 to 30 parts by weight based thereon. The blending amount thereof, when being less than 10 parts by weight, results in failure to assure sufficient adhesivity, whereas the amount, when being more than 50 parts by weight, gives rise to unreasonably high hardness of the thermoplastic material to be produced.

The resin composition according to the present invention which comprises the components (a1), (b1) and (c1) should have a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%. The resin composition, unless meets the above-mentioned requirements, falls into an unsuitable material as a gasket material.

In order to improve the workability and heat resistance of the thermoplastic material in the resin composition according to the present invention, polystyrenic resin may be employed in combination with the above-mentioned component (c1). There is preferably usable polystyrenic resin produced by any of radical polymerization method and ionic polymerization method, provided that it is produced by a well known method. The polystyrenic resin has a number average molecular weight in the range of preferably 5,000 to 500,000, more preferably 10,000 to 200,000, and a molecular weight distribution {the ratio of weight average molecular weight to number average molecular weight ($M_w/M_n$)} of at most 5.

Examples of the polystyrenic resin include polystyrene, styrene-butadiene block copolymer having styrene moiety content of at least 60% by weight, rubber-reinforced polystyrene, poly-α-methylstyrene and poly-p-t-butylstyrene. The exemplified polystyrenic resin may be used alone or in combination with at least one other. There is also usable a copolymer obtained by polymerizing the mixture of monomers each constituting any of the polymers.

The combinational use of the polystyrenic resin and the component (c1) tends to increase the hardness of the resultant material as compared with the single use of (c1).

Accordingly, it is possible to adjust the hardness of the thermoplastic material to be obtained by selecting the blending proportion thereof. Preferably in this case, the blending proportion by weight of the modified polyolefinic resin/polystyrenic resin is selected in the range of 95/5 to 5/95.

In the present invention in order to obtain the resin composition comprising a larger amount of the softening agent and a smaller amount of a high polymer organic material, it is preferable to select both the components so that the difference in solubility parameter value $\delta = (\Delta E/V)^{1/2}$ ($\Delta E$=molar evaporation energy, V=molar volume) between the softening agent and the polymer block composed principally of a conjugated diene compound constituting the hydrogenated block copolymer is made to be at most 3.0, preferably at most 2.5, more preferably at most 1.0. The difference therebetween, when being more than 3.0, unfavorably leads to difficulty in maintainability of a larger amount of the softening agent from the aspect of compatibility of both the materials, thus hindering the low hardness of the resin composition to be obtained, and causing liability to the generation of bleed in the softening agent.

It is possible to blend when desired, polyphenylene ether resin in the resin composition for the purpose of improving the compression set and the like purpose. The polyphenylene ether resin to be used here is a homopolymer composed of the repeating unit represented by the following general formula or a copolymer containing the aforesaid repeating unit:

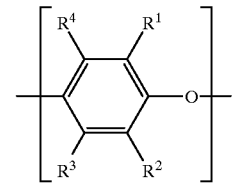

wherein $R^1$, $R^2$, $R^3$, $R^4$ are each independently of one another, a hydrogen atom, a halogen atom or a hydrocarbon group.

The polyphenylene ether may be selected for use from well-known ones, and is specifically exemplified by poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether) and poly(2,6-dichloro-1,4-phenylene ether ). There is also usable polyphenylene ether copolymer such as the copolymer of 2,6-dimethylphenol and a monohydric phenol (e.g. 2,3,6-trimethylphenol and 2-methyl-6-butylphenol). Of these are preferable poly(2,6-dimethyl-1,4-phenylene ether) and the copolymer of 2,6-dimethylphenol and 2,3,6-trimethylphenol, and is particularly preferable poly(2,6-dimethyl-1,4-phenylene ether).

The blending amount of the polyphenylene ether resin can be preferably selected in the range of 10 to 250 parts by weight based on 100 parts by weight of the total sum amount of the components (a1), (b1) and (c1). The blending amount thereof, when being more than 250 parts by weight, unfavorably causes a fear that the hardness of the resultant resin composition is made unreasonably high, whereas the amount, when being less than 10 parts by weight, unfavorably leads to insufficient effect on improving the compression set of the resin composition to be produced by blending.

The resin composition according to the present invention may be blended with a scaly inorganic filler such as clay, diatomaceous earth, talc, barium sulfate, calcium carbonate, magnesium carbonate, a metal oxide, mica, graphite and aluminum hydroxide; a granular or powdery filler in the form of solid such as various metallic powders, glass powder, ceramic powder and granular or powdery polymer; and other natural or artificial short fiber and long fiber such as glass fiber, metallic fiber and various polymer fibers.

Moreover, it is possible to contrive the weight saving of the resin composition according to the present invention by blending therein a hollow filler, for instance, an inorganic hollow filler such as glass balloon, an organic hollow filler such as polyvinylidene fluoride and copolymer of polyvinylidene fluoride, etc. Further it is possible to mix therein a variety of foaming agents to improve various physical properties such as weight saving thereof and also to mechanically mix therein a gas at the time of mixing.

In addition, it is possible to combinationally use at need as an other additive, a flame retardant, antimicrobial agent, hindered amine base light stabilizer, ultraviolet absorber, anti-oxidant, coloring agent, cumarone resin, cumarone-indene resin, phenol-terpene resin, petroleum base hydrocarbon, various tackifiers such as rosin derivatives, various adhesive base elastomers such as Rheostomer (trade name, manufactured by Riken Vinyl Industry Co., Ltd.) and other thermoplastic elastomer or resin such as Hibler (trade name, manufactured by Kuraray Chemical Co., Ltd.: block copolymer in which polystyrene blocks are bonded to both ends of vinyl-polyisoprene block ) and Nolex (trade name, manufactured by Nippon Zeon Co., Ltd.).

No specific limitation is imposed on the processes for producing the resin composition of the present invention, and any of well known production processes is applicable thereto. For instance, the resin composition is readily producible by melt kneading the aforesaid components and additive components that are used as desired by the use of a heating kneader such as a single screw extruder, a twin screw extruder, a roll, a Banbury mixer, a prabender, a kneader or a high shear type mixer, or by heat melt kneading the resultant mixture to which is further added as desired, a crosslinking agent such as an organic peroxide, crosslinking assistant or the like, or by heat melt kneading the a mixture formed by simultaneously mixing the necessary components.

In addition, the resin composition is producible by preparing in advance, a thermoplastic material which is obtained by kneading a high molecular organic material and a softening agent, and further mixing thus prepared thermoplastic material with at least one high molecular organic material having a type same as or different from those used in advance.

It is possible in the resin composition according to the present invention to crosslink the composition by adding a crosslinking agent such as an organic peroxide, a crosslinking assistant or the like.

The crosslinking agent which can be added for the purpose of partial crosslinking is exemplified by an organic peroxide, specifically by 2,5-dimethyl-2,5-di(t-butylperoxy)-hexane; 2,5-dimethyl-2,5-di(benzoylperoxy)-hexane; t-butylperoxybenzoate; dicumyl peroxide; t-butylcumyl peroxide; diisopropylbenzohydro-peroxide; 1,3-bis-(t-butylperoxyisopropyl)-benzene; benzoyl peroxide; and 1,1-di(t-butylperoxy)-3,3,5-trimetylcyclohexane. Useful crosslinking assistance is exemplified by divinylbenzene, trimethylol propane triacrylate, ethylene dimethacrylate, diallyl phthalate, quinonedioxime, phenylenebismaleimide and polyethylene glycol dimethacrylate. It is possible to regulate the degree of crosslinking by optionally using any of the cross-linking agents and crosslinking assistants in an amount in the range of 0.1 to 5 parts by weight per 100 parts by weight the total amount of the blending materials. Any of the crosslinking agents and crosslinking assistants may be used in combination with at least one other species at need. In the case of using an unsaturated silane compound as a crosslinking assistant, it is possible to proceed with crosslinking in contact with water in the presence of a catalyst for silanol condensation reaction.

The resin composition according to the present invention is usable as a gasket material by molding the composition into a desired shape by means of a well known method, for instance, injection molding, extrusion molding or the like. In particular, owing to excellent adhesivity to a metal, the resin composition is producible into a gasket integrated with a metal in which the composition is integrated with a metallic part such as a cover of a case and the like without applying coating of an adhesive or installing a through hole or groove.

The resin composition according to the present invention is preferably usable as a gasket material particularly for hard disc drive which is required to have enhanced dust preventive properties and besides as an ordinary gasket material, a packing material and portions required to have airtightness.

Another thermoplastic elastomer composition according to the present invention comprises the components (a2), (b2), (c2) and (d2). The component (a2) is the same as the component (a1), and the preferable ranges of weight average molecular weight, content of (non-crystalline) styrene block and (non-crystalline) glass transition temperature are the same as those of the component (a1). The component (b2) is the same as the component (b1), and the preferable range of the blending proportion of (b2) to (a2) is the same as that of (b1) to (a1).

The aforesaid component (c2) in the thermoplastic elastomer composition according to the present invention, that is, a modified hydrogenated block copolymer is blended for the purpose of enhancing workability, heat resistant characteristics and adhesivity to a metal, said block copolymer being obtained by hydrogenating a block copolymer in which a functional group is imparted to a block copolymer consisting essentially of at least one polymer block composed principally of a vinyl aromatic compound and at least one polymer block composed principally of a conjugated diene compound.

The modified hydrogenated block copolymer particularly preferably has a functional group having an absorption band at a wave number in the range of 1500 to 2000 cm$^{-1}$ in its infrared absorption spectrum.

As described hereinbefore, according to "High Polymer Analysis Handbook" (published from Kinokuniya Bookshop) which describes "Application to Qualitative Analysis" of infrared analysis for high polymer materials such as plastics and rubber, it has been turned out that there is a characteristic absorption band peculiar to each high polymer composition, and that there exists an absorption band characteristic of a functional group of a polymer in the range of 1550 to 1950 cm$^{-1}$ in its infrared absorption spectrum. For instance, it is described in the aforesaid Handbook that there appears an absorption assigned to a carbonyl group such as a ketone, an aldehyde and amine in the vicinity of 1700 cm$^{-1}$, an absorption assigned to an ester, an acid chloride and an acid anhydride in the vicinity of 1850 to 1725 cm$^{-1}$ that are higher wave number side, and an absorption band assigned to a dissociated carboxylic acid in the range of 1610 to 1550 cm$^{-1}$, specifically that there appears an absorption assigned and peculiar to a carbonyl group in the range of 1750 to 1720 cm$^{-1}$.

As a result of intensive research and investigation made by the present inventors, it has been found that preferable modified hydrogenated block copolymer as the component (c2) is that which has a functional group (maleic anhydride, acrylic acid, amides, carboxylic esters, etc.) having an absorption band in the region of 1500 to 2000 cm$^{-1}$.

The functional group having an absorption band in the region of 1500 to 2000 cm$^{-1}$ is preferably in the form of an unsaturated carboxylic acid, particularly maleic anhydride and acrylic acid which exert favorable adhesivity as compared with an acid esters. The hydrogenated block copolymer having such functional group is exemplified by modified diblock copolymer in which a functional group is introduced in the diblock copolymer of crystalline polyethylene and polystyrene, modified triblock copolymer (modified SEBS) in which a functional group is introduced in the triblock copolymer of styrene-ethylene/butylene-styrene, modified triblock copolymer (modified SEPS) in which a functional group is introduced in the triblock copolymer of styrene-ethylene/propylene-styrene and modified triblock copolymer in which a functional group is introduced in the triblock copolymer of styrene-ethylenepropylene/ethylenebutylene-styrene. Of the modified di/tri-block copolymers are preferable modified SEBS, modified SEPS and modified triblock copolymer in which a functional group is introduced in the triblock copolymer of styrene-ethylenepropylene/ethylenebutylene-styrene. The modified hydrogenated block copolymers are readily available from the marketed products such as Krayton G series (trade name, manufactured by Shell Chemical Co., Ltd.) and Tuftec M series (trade name, manufactured by Asahi Chemical Industry Co., Ltd.) and the like.

The modification rate of the component (c2) {% by weight, parts by weight of a modifying agent to be used per 100 parts by weight of polypropylene} is preferably at least one (1) % by weight in order to assure sufficient adhesivity.

The blending amount of the component (c2) is 10 to 50 parts by weight based on 100 parts by weight of the above-mentioned component (a2), preferably 10 to 30 parts by weight based thereon. The blending amount thereof, when being less than 10 parts by weight, results in failure to assure sufficient adhesivity, whereas the amount, when being more than 50 parts by weight, gives rise to deteriorated compression set of the thermoplastic material to be produced.

The compound composed principally of a crystalline polyolefin as the component (d2) is blended for the purpose of enhancing workability and heat resistant characteristics. The compound composed principally of a crystalline polyolefin is preferably a compound composed principally of polypropylene, and is exemplified by isotactic polypropylene, the copolymer of propylene and a small amount of an other α-olefin for instance, propylene-ethylene copolymer and propylene/4-methyl-1-pentene copolymer and the like copolymer. In the case of using isotactic polypropylene copolymer as polyolefin, preferably usable is the aforesaid copolymer having an MFR {as measured in accordance with JIS K7210 at 230° C. under a load of 2.16kg (21.2 N)} being at least 0.1 g/10 minutes, particularly at least 0.5 g/10 minutes.

The blending amount of the component (d2) is 0 to 20 parts by weight based on 100 parts by weight of the above-mentioned component (a2), preferably 0 to 10 parts by weight based thereon. The blending amount thereof, when being more than 20 parts by weight, gives rise to unreasonably high hardness of the thermoplastic elastomer composition to be produced.

The thermoplastic elastomer composition according to the present invention which comprises the components (a2), (b2) (c2) and (d2) should have a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%. The thermoplastic elastomer composition, unless meets the aforesaid requirements, falls into an unsuitable material as a gasket material.

In the present invention in order to obtain the thermoplastic elastomer composition comprising a larger amount of the softening agent and a smaller amount of a high polymer organic material, it is preferable to select both the components so that the difference in solubility parameter value $\delta=(\Delta E/V)^{1/2}$ ($\Delta E$=molar evaporation energy, V=molar volume) between the softening agent and the polymer block composed principally of a conjugated diene compound constituting the hydrogenated block copolymer is made to be at most 3.0, preferably at most 2.5, more preferably at most 1.0. The difference between the two, when being more than 3.0, unfavorably leads to difficulty in maintainability of a larger amount of the softening agent from the aspect of compatibility of both the materials, hindering the low hardness of the thermoplastic elastomer composition to be obtained, and causing liability to the generation of bleed in the softening agent.

It is possible to blend when desired, polyphenylene ether resin in the thermoplastic elastomer composition of the present invention for the purpose of improving the compression set and the like purpose. The polyphenylene ether resin to be used here is a homopolymer composed of the repeating unit represented by the above-mentioned general formula or a copolymer containing the aforesaid repeating unit, and is specifically exemplified by those same as the foregoing.

The blending amount of the polyphenylene ether resin can be preferably selected in the range of 10 to 250 parts by weight based on 100 parts by weight of the total sum amount of the components (a2), (b2) and (c2). The blending amount thereof, when being more than 250 parts by weight, unfavorably causes a fear that the hardness of the resultant thermoplastic elastomer composition is made unreasonably high, whereas the amount, when being less than 10 parts by weight, unfavorably leads to insufficient effect on improving the compression set of the resin composition to be produced by blending.

The thermoplastic elastomer composition according to the present invention may be blended with the fillers and additives same as those in the foregoing resin composition, and is producible by the process same as the process in the foregoing resin composition.

The thermoplastic elastomer composition according to the present invention is preferably usable as a gasket material particularly for hard disc drive which is required to have enhanced dust preventive properties and besides as an ordinary gasket material, a packing material and portions required to have airtightness.

The composite molded body according to the invention is formed by integrating through thermally fusing adhesion, a metallic sheet laminated with a thermoplastic resin having a hardness as measured in accordance with JIS K6253 with a durometer of type A of at least 50 degrees and a thermoplastic elastomer composition having a hardness as measured in accordance with JIS K6253 with a durometer of type A being at most 60 degrees and a compression set as measured in accordance with JIS K6262 after being allowed to stand at 70° C. under a compression ratio of 25% for 22 hours being at most 50%.

In the composite molded body of the invention, the thermoplastic resin for laminating the metallic sheet has a hardness as measured in accordance with JIS K6253 with a durometer of type A of at least 50 degrees. The resin is exemplified by polyolefins such as polypropylene and polyethylene, polystyrene and polyvinyl chloride, and is available from marketed products. The above-mentioned hardness, when being less than 50 degrees, brings about the disadvantages in that a large amount of a plasticizer is liable to cause such troubles as defects in electrical contact and magnetic recording as a cover material of precision machinery because of gas generation due to spattering and volatilization of the plasticizer. Preferably, the hardness of the thermoplastic resin is at least 70 degrees. By selecting the blend of the thermoplastic resin for laminating the metallic sheet, it is made possible to control the vibration damping characteristics, electroconductivity and heat transmission properties, thereby enabling to produce a gasket fitted to a cover having a high value added.

The metallic sheet to be used is exemplified by an aluminum sheet, an iron sheet and stainless steel sheet without specific limitation thereto. The thermoplastic resin for laminating the metallic sheet has a thickness of preferably at most 100 $\mu$m particularly preferably in the range of 5 to 50 $\mu$m from the viewpoints of dimensional accuracy and precision and the press workability of the metallic sheet. The metallic sheet laminated with a thermoplastic resin is available from marketed products exemplified by Aluset (trade name, manufactured by Mitsubishi Plastics Industries Ltd.).

As the thermoplastic elastomer composition to be thermally fusingly adhered to the metallic sheet, use is made of that which has a hardness as measured in accordance with JIS K6253 with a durometer of type A (hardness by JIS-A) being at most 60 degrees and a compression set as measured in accordance with JIS K6262 after being allowed to stand at 70T under a compression ratio of 25% for 22 hours being at most 50%. The hardness, when exceeding 60 degrees, brings about the disadvantages in that in the case where the composite molded body of the present invention is made to the form of a gasket fitted to a cover, and the gasket is used in a case for housing electronic equipment, the adhesivity and tackiness to a box body of the case come to be inferior. Preferably, the hardness of the thermoplastic elastomer composition to be used in the present invention is in the range of 10 to 40 degrees. The compression set, when exceeding 50%, gives rise to the disadvantages in that the performances of the gasket are non-maintainable for a long period of time, and the gasket is unendurable to repeated usage. Preferably, the compression set of the thermoplastic elastomer composition to be used therein is at most 40%

The thermoplastic elastomer constituting the thermoplastic elastomer composition is exemplified by styrenic thermoplastic elastomer, olefinic thermoplastic elastomer and urethanic thermoplastic elastomer, and is usable alone or in combination with at least one other. In particular, with regard to a case for housing electronic equipment, it is preferable to use such a material that surely interrupts moisture and air and besides, does not generate a halogen base gas or an acidic gas. Styrenic thermoplastic elastomer or its composition is available from marketed products such as Tuftec series(trade name, manufactured by Asahi Chemical Industry Co., Ltd.), Septon series (trade name, manufactured by Kuraray Co., Ltd.) and Krayton G series (trade name, manufactured by Shell Chemical Co., Ltd.).

The olefinic thermoplastic elastomer is available from marketed products such as Sunptlen series (trade name, manufactured by AES Co., Ltd.) and Torefsin series (trade name, manufactured by AES Co., Ltd.). The urethanic thermoplastic elastomer is available from marketed products such as Miraclon U series (trade name, manufactured by Kuraray Co., Ltd.).

It is preferable that the thermoplastic elastomer composition comprises 100 parts by weight of a (a3) hydrogenated block copolymer which is obtained by hydrogenating a block copolymer consisting essentially of polystyrene block and at least one polymer block composed principally of a conjugated diene compound in which the content by weight of the polystyrene moiety that is contained in the hydrogenated block copolymer is in the range of 20 to 40%; 100 to 500 parts by weight of a (b3) non-aromatic softening agent having a kinematic viscosity at 40° C. of at least 300mm$^2$s$^-$$_1$; and 5 to 100 parts by weight of a (c3) polyolefinic hydrocarbon resin.

The hydrogenated block copolymer as the component (a3) is exemplified by triblock copolymer of styrene-ethylene/butylene-styrene (SEBS) and triblock copolymer of styrene-ethylene/propylene-styrene (SEPS) that are obtained by hydrogenating block copolymer of polystyrene/polybutadiene/polystyrene or block copolymer of polystyrene/polyisoprene/polystyrene. The ratio by weight of the polystyrene moiety that is contained in the hydrogenated block copolymer is in the range of 20 to 40% preferably 25 to 35%.

Preferably, the hydrogenated block copolymer has a number average molecular weight of at least 60,000. The number average molecular weight thereof, when being less than 60,000, gives rise to such disadvantage as the case may be, that the bleed of the softening agent and compression set that are unreasonably increased render the thermoplastic elastomer composition unendurable to practical use. An upper limitation on the number average molecular weight thereof is not specified in particular, but is usually 400,000 approximately.

The above-mentioned hydrogenated block copolymer is used alone in many cases, but may be used in combination with at least one other.

The non-aromatic softening agent as the component (b3) in the thermoplastic elastomer composition according to the present invention is blended for the purpose of lowering the hardness of the thermoplastic elastomer as the component (a3), and the agent has a kinematic viscosity at 40° C. of at least 300 mm$^2$s$^{-1}$. The kinematic viscosity at 40° C. thereof, when being lower than 300 mm$^2$s$^{-1}$, brings about such disadvantage that marked weight loss of the composition due to volatilization and marked bleed of a softening agent render the composition unendurable to practical use. From the viewpoints of practical application and production process, the kinematic viscosity at 40° C. thereof is in the range of preferably 300 to 10,000 mm$^2$s$^{-1}$, particularly preferably 300 to 5,000 mm$^2$s$^{-1}$. Moreover the weight average molecular weight thereof is at most 20,000, preferably at most 10,000, particularly preferably at most 5,000. Preferably usable softening agent is usually liquid or in the form of liquid at room temperature. There are usable both hydrophilic and hydrophobic softening agents.

The softening agent having such properties may be properly optionally selected for use from those exemplified in the preceding item (b1), and is preferably the same as those. The blending amount of the softening agent is 100 to 500 parts by weight based on 100 parts by weight of the aforesaid component (a3), preferably 100 to 200 parts by weight based thereon. The blending amount thereof, when being less than 100 parts by weight, leads to a failure to achieve sufficient low hardness, thus causing insufficient flexibility of the thermoplastic elastomer composition, whereas the amount, when being more than 500 parts by weight, gives rise to liability to bleeding of the softening agent and a cause of deteriorating the mechanical strength of the thermoplastic elastomer composition.

The above-mentioned polyolefinic hydrocarbon resin as the component (c3) in the thermoplastic elastomer composition according to the present invention is blended for the purpose of enhancing the workability and heat resistant characteristics thereof, and is exemplified by polyethylene, polypropylene, poly-1-butene, poly-3-methyl-1-butene, poly-1-pentene, poly-1-hexene poly-4-methyl-1-pentene, poly-1-octene, poly-1-decene, poly-1-dodecene, poly-1-tetradecene, poly-1-hexadecene, poly-1-octadecene, poly-1-eicosene, polystyrene, poly-p-methylstyrene, poly-isopropylstyrene, poly-t-butylstyrene, copolymer of propylene and a small amount of an other α-olefin (for instance, propylene-ethylene copolymer and propylene/4-methyl-1-pentene copolymer).

Examples of the marketed products of the polyolefinic hydrocarbon resin include polypropylene and syndiotactic polypropylene manufactured by Exxon Chemical Japan Ltd., polypropylene manufactured by Japan Polychemicals Co., Ltd., Youmex Series manufactured by Sanyo Chemical Industries, Ltd., Nuculele Series manufactured by Du Pont-Mitsui Polychemicals Co., Ltd., Polybond Series manufactured by UniRoyal Co., Ltd. and polyolefin having a functional group such as Exceler Series manufactured by Exxon Chemical Japan Ltd.

The blending amount of the component (c3) is 5 to 100 parts by weight based on 100 parts by weight of the above-mentioned component(a3), preferably 5 to 30 parts by weight based thereon. The blending amount thereof, when being more than 50 parts by weight, gives rise to a fear of unreasonably high hardness of the thermoplastic elastomer composition to be produced.

The constitution as described hereinbefore in the composite molded body of the present invention enables the metallic sheet and the thermoplastic elastomer to be readily integrated with each other, dispensing with a surface treatment of the metallic sheet, use of an adhesive, or blend of an adhesive (tacky adhesive) material in the thermoplastic elastomer thus without deteriorating the physical properties thereof. In addition, the composite molded body is well suited for use as a gasket in a hard disc drive apparatus, since the metallic sheet is laminated with the thermoplastic resin having high hardness.

FIG. 1, being one of the embodiments of the composite molded body according to the present invention, is a perspective view showing a gasket fitted to a cover used for a case housing a hard disc drive apparatus (gasket fitted to a cover viewed from the sealing face side). In FIG. 1 the gasket 12 is allowed to firmly adhere to the surface of a metallic cover body 11, which functions as a cover used for a case housing a hard disc drive apparatus. There are arranged such devices as a magnetic disc, a magnetic head and an actuator in the central space portion of the gasket fitted to the cover on the box side of the case housing a hard disc drive apparatus. These devices are enclosed with a metallic box body (not illustrated on the figure) and the gasket fitted to the cover, and are accommodated in the case housing a hard disc drive apparatus.

Further it is made possible in the composite molded body according to the present invention, to prevent the adhesion of contaminants such as dirt and leakage of electromagnetic waves by mixing an electroconductive material in the thermoplastic resin having high hardness and/or the thermoplastic elastomer. It is also made possible therein to prevent heat accumulation in a hard disc, since the heat generated inside can be released outside by mixing a material having high heat releasability in the thermoplastic resin having high hardness.

The process for producing the composite molded body of a resin and metal according to the present invention comprises subjecting part or all of the surface of a metallic part that comes into contact with a resin portion to a corona treatment or a plasma treatment, thereafter placing the metallic part thus treated in a mold, and subsequently injecting the thermoplastic elastomer composition onto the surfaces of the metallic part placed in the mold to form the resin portion.

The corona treatment in the process according to the present invention is not a particular treatment, but is an ordinary corona discharge treatment which is carried out for any of various purposes of applications. There is usable an apparatus of any of spark gap system, vacuum tube system and solid state system, and the treatment condition is regulated by the type of the apparatus to be used without any limitation.

The plasma treatment in the process according to the present invention is not a particular treatment, but is an ordinary plasma discharge treatment under vacuum or atmospheric pressure which is carried out for any of various purposes of surface treatment. There is usable any of gases including argon, oxygen, nitrogen, $CF_4$/oxygen and ethylene.

The surface of the metallic part need not be subjected to a corona treatment or plasma treatment in whole, but only needs to be subjected thereto in part or whole of the surfaces of the metallic part in contact with the resin portion, preferably at least 50% in area of the portion in contact therewith.

The metallic part to be used in the process for producing the composite molded body of the resin and metal according to the present invention is not specifically limited, but may be properly optionally selected for use according to the purpose of use thereof from cold rolled steel sheets, galvanized steel sheets, aluminum/zinc alloy plated steel sheets, stainless steel sheets, aluminum sheets, aluminum alloy sheets, magnesium sheets and magnesium alloy sheets, non-electrolytic nickel plated aluminum sheets and the like. Injection molded magnesium sheets are also usable. There is preferably usable a metallic sheet which is treated with non-electrolytic nickel plating for its being excellent in corrosion resistance. As a method for non-electrolytic nickel plating, there is usable any of well known methods that have heretofore been applied to metallic raw materials, for instance, a method which comprises immersing a metallic sheet to be treated in a non-electrolytic nickel plating bath comprising an aqueous solution at a pH of approximately 4.0 to 5.0 and at a temperature of approximately 85 to 95° C. which contains nickel sulfate, sodium hypochlolite, lactic acid, propionic acid and the like each in a proper proportion.

In the case where the composite molded body of the resin and metal is a gasket integrated with a cover, the thickness of the metallic sheet is properly optionally selected for use according to the purpose of use of the cover body, and it is in the range of usually from 0.3 to 1.0 mm, preferably from 0.4 to 0.6 mm.

The thermoplastic elastomer to be used in the process for producing the composite molded body of the resin and metal according to the present invention is not specifically limited, but may be properly optionally selected for use from the thermoplastic elastomer of any of styrene base, olefin base, urethane base, ester base and the like.

The present inventors have previously proposed a thermoplastic elastomer composition as a material which has excellent rubber elasticity, favorable oil maintainability, low hardness, excellent seating properties and low compression as a gasket material {refer to Japanese Patent Application No. 344879/1999 (Heisei-11)}, the thermoplastic elastomer composition comprising 100 parts by weight of a (a4) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 150,000, in which the at least one polymer block composed principally of a vinyl aromatic compound is polystyrene, and in which the content by weight of the polystyrene moiety that is contained in the hydrogenated block copolymer is in the range of 20 to 40%; 50 to 200 parts by weight of a (b4) non-aromatic rubber-softening agent having a kinematic viscosity at 40° C. of at least 300mm$^2$s$^{-1}$; and 5 to 50 parts by weight of a (c4) polyolefinic resin composed principally of polypropylene. In the process according to the present invention, there are preferably usable the thermoplastic elastomer just mentioned and also the thermoplastic elastomer composition which is obtained by replacing the above-mentioned component (c4) with 5 to 50 parts by weight of the polyolefinic resin composed principally of polyethylene.

In addition, the present inventors have also proposed a thermoplastic elastomer composition having improved adhesivity between a metal and the above-mentioned thermoplastic elastomer composition {refer to Japanese Patent Application No. 036187/2000 (Heisei-12)}, the thermoplastic elastomer composition comprising 100 parts by weight of a (a5) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene, and in which the content by weight of the polystyrene moiety that is contained in the hydrogenated block copolymer is in the range of 20 to 40%; 100 to 200 parts by weight of a (b5) non-aromatic rubber-softening agent having a kinematic viscosity at 40° C. of at least 300mm$^2$s$^{-1}$ and 10 to 50 parts by weight of a (c5) modified polyolefinic resin, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%. The thermoplastic elastomer composition just stated further enhances the working effect of the invention, and is well suited for use in the production process thereof.

In the foregoing thermoplastic elastomer composition having improved adhesivity to a metal, the hydrogenated block copolymer as the component (a5) is exemplified by that as the component (a1), and the preferable ranges of weight average molecular weight, content of (non-crystalline) styrene block an glass transition temperature of (non-crystalline) styrene block are same as those in the component (a1). The component (b5) is the same as the component (b1).

The blending amount of the component (b5) is 100 to 200 parts by weight based on 100 parts by weight of the aforestated component (a5), preferably 100 to 150 parts by weight based thereon. The blending amount thereof, when being less than 100 parts by weight, results in failure to assure sufficient low hardness, causing a fear of insufficient flexibility of the thermoplastic material to be produced, whereas the amount, when being more than 200 parts by weight, gives rise to liability of the softening agent to bleed and a cause for deterioration in the mechanical strength of the thermoplastic material to be produced. Preferably, the blending amount of the softening agent is properly optionally selected within the aforestated range in accordance with the molecular weight of the hydrogenated block copolymer as the component (a5) and the types of other component to be added to the hydrogenated block copolymer.

In the foregoing thermoplastic elastomer composition having improved adhesivity to a metal, the modified polyolefinic resin as the component (c5) is blended for the purpose of improving the workability, heat resistant characteristics and adhesivity to a metal.

The polyolefinic resin to be modified is preferably a resin composed principally of polyethylene or polypropylene, and is exemplified by isotactic polypropylene and a copolymer of propylene and a small amount of an other α-olefin(for instance, propylene-ethylene copolymer and propylene/4-methyl-1-pentene copolymer). In the case of using isotactic polypropylene copolymer as a polyolefinic resin, there is preferably usable the aforesaid copolymer having an MFR {as measured in accordance with JIS K7210 at 230° C. under a load of 2.16 kg (21.2 N)} being at least 0.1 g/10 minutes, particularly at least 0.5 g/10 minutes.

The modified polyolefinic resin is formed by polymerizing such polyolefinic resin with a polymerizable compound having a functional group, particularly preferably having a functional group which has an absorption band at a wave number in the range of 1500 to 2000 cm$^{-1}$ in its infrared absorption spectrum.

As described hereinbefore, according to "High Polymer Analysis Handbook" (published from Kinokuniya Bookshop) which describes "Application to Qualitative Analysis" of infrared analysis for high polymer materials such as plastics and rubber, it has been turned out that there is a characteristic absorption band peculiar to each high polymer composition, and that there exists an absorption band characteristic of a functional group of a polymer in the range of 1550 to 1950 cm$^{-1}$ in its infrared absorption spectrum. For instance, it is described in the above-mentioned Handbook that there appear an absorption assigned to a carbonyl group such as a ketone, an aldehyde and amine in the vicinity of 1700 cm$^{-1}$, an absorption assigned to an ester, an acid chloride and an acid anhydride in the vicinity of 1850 to 1725 cm$^{-1}$ that are higher wave number side, and an absorption band assigned to a dissociated carboxylic acid in the range of 1610 to 1550 cm$^{-1}$, specifically that there appears an absorption assigned and peculiar to a carbonyl group in the range of 1750 to 1720 cm$^{-1}$. In addition, with regard to infrared absorption spectrum of maleic anhydride-grafted polypropylene, it is described therein that there appears a stretching vibration assigned to C=O in maleic anhydride in the vicinity of 1785cm$^{-1}$ and 1860 cm$^{-1}$. On the one hand, there is no infrared absorption in this region (1550 to 1950 cm$^{-1}$) as to the infrared absorption spectrum of pure polypropylene as described in the Handbook.

As a result of intensive research and investigation made by the present inventors, it has been found that preferable modified polyolefinic resin as the component (c5) is that which has a functional group (maleic anhydride, acrylic acid, amides, carboxylic esters, etc.) having an absorption band in the region of 1500 to 2000 cm$^{-1}$.

The aforesaid functional group having an absorption band in the region of 1500 to 2000 cm$^{-1}$ is preferably in the form of an unsaturated carboxylic acid, particularly maleic anhydride, acrylic acid or the like, which exhibits favorable adhesivity as compared with an acid esters. The modified polyolefinic resin having such a functional group is available from the marketed products such as Nuculele Series (trade name, manufactured by Du pont-Mitsui Polychemicals Co, Ltd.), Youmex Series (trade name, manufactured by Sanyo Chemical Industries Ltd.), Exceler Series (trade name, manufactured by Exxon Chemical Japan Ltd.), Polybond Series (trade name, manufactured by UniRoyal Co, Ltd.), Admer Series (trade name, manufactured by Mitsui Chemicals Inc.) and the like.

The modification rate of the component (c5) {% by weight, parts by weight of a modifying agent to be used per 100 parts by weight of polypropylene} is preferably at least one (1) % by weight in order to assure sufficient adhesivity.

The blending amount of the component (c5) is 10 to 50 parts by weight based on 100 parts by weight of the above-mentioned component (a5), preferably 10 to 30 parts by weight based thereon. The blending amount thereof, when being less than 10 parts by weight, leads to failure to gain necessary adhesivity, whereas the amount, when being more than 50 parts by weight, brings about unreasonably high hardness of the thermoplastic material to be produced.

The thermoplastic elastomer composition according to the present invention which comprises the components (a5), (b5) and (c5), or the aforestated components (a4), (b4) and (c4) should have a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%. The thermoplastic elastomer composition, unless meets the above-mentioned requirements, falls into an unsuitable material as a gasket material.

The foregoing thermoplastic elastomer compositions may be blended with the fillers and/or additives same as those in the resin composition comprising the components (a1), (b1) and (c1), and are producible by the process same as the process in the foregoing resin composition.

The process for producing a gasket integrated with a cover body by placing a metallic cover body in a mold, and injecting a gasket material composed of a thermoplastic elastomer composition onto the surfaces of said cover body so as to form a gasket portion is characterized in that the thermoplastic elastomer composition is injection cast from the direction different from the direction towards a butt contact surface on the gasket portion upon the use thereof.

The above-mentioned direction different from the direction towards a butt contact surface on the gasket portion upon the use thereof in the production process according to the present invention signifies the direction towards the reverse face of the gasket portion, that is, the face in contact with the metallic cover and the direction towards the side face of the gasket portion. A method for injection casting from any of such directions will be described with reference to FIG. 2 to FIG. 5.

Figure 2:
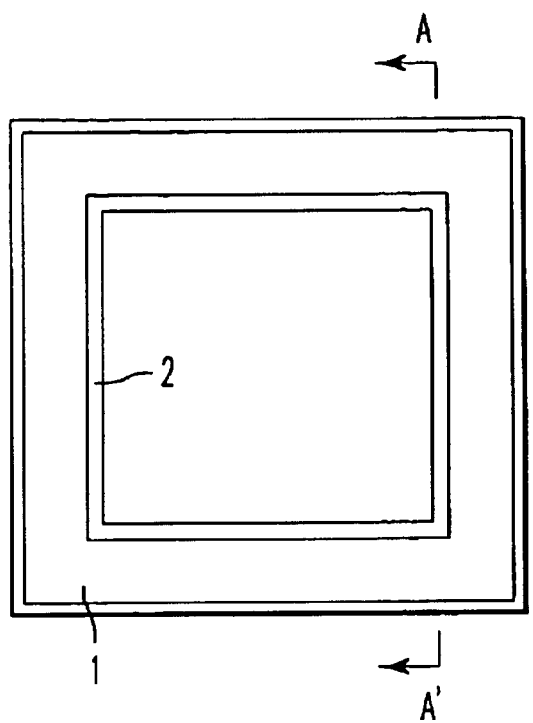
FIG. 2 is a plan view which shows one example of a gasket integrated with a cover body obtained by the process according to the present invention, wherein the symbols 1 and 2 denote a cover body and a gasket, respectively.
Figure 3:
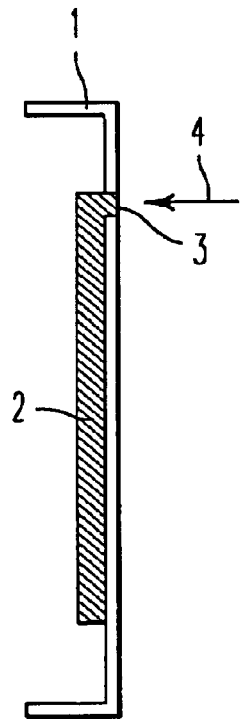
FIG. 3 is a cross sectional view taken on the line A–A' of FIG. 2, wherein the symbols 3 and 4 denote a hole (pinhole) and an arrow, respectively.

FIG. 2 is a plan view which shows the case where the gasket material composed of the thermoplastic elastomer composition is injected from the direction towards the reverse face (against butt contact surface) of the gasket portion, that is, the face in contact with the metallic cover, and FIG. 3 is a cross sectional view taken on the line A–A' of FIG. 2.

In FIG. 2, a gasket portion 2 is formed on a metallic cover 1 in which four edges are bent in the shape of "L", and the face of the gasket portion 2 shown on the figure is butt contact surface.

The gasket integrated with a cover is produced by placing in a mold, the metallic cover 1 in which a hole 3 (pinhole) has been made in advance as illustrated on FIG. 3, and injection casting a thermoplastic elastomer composition into a cavity in the mold through the hole 3 in the metallic cover 1 from the direction towards the rear face of the gasket portion, that is, the face thereof in contact with metallic cover 1 (as shown by an arrow 4 on FIG. 3 ).

Figure 4:
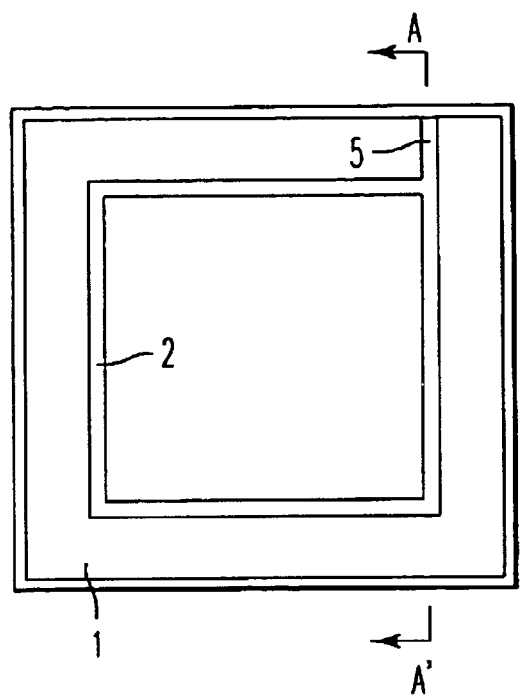
FIG. 4 is a plan view which shows one example of a gasket integrated with a cover body obtained by the process according to the present invention, wherein the symbols 1, 2 and 5 denote a metallic cover, a gasket and a runner, respectively.
Figure 5:
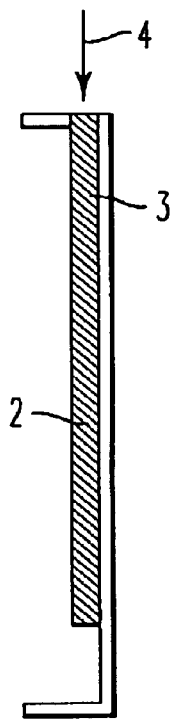
FIG. 5 is a cross sectional view taken on the line A–A' of FIG. 4, wherein the symbols 3 and 4 denote a hole (pinhole) and an arrow, respectively.

FIG. 4 is a plan view which shows the case where the gasket material composed of the thermoplastic elastomer composition is injected in the direction towards the side face of the gasket portion, and FIG. 5 is a cross sectional view taken on the line A–A' of FIG. 4.

In FIG. 4, a gasket portion 2 is formed on a metallic cover 1, and the face of the gasket portion 2 shown on the figure is butt contact surface.

The gasket integrated with a cover is produced by placing in a mold, the metallic cover 1 in which a hole 3 (pinhole) has been made in advance as illustrated on FIG. 5, and injection casting a thermoplastic elastomer composition into a cavity in the mold through the hole 3 in the metallic cover 1 from the direction towards the side face of the gasket portion (as shown by an arrow 4 on FIG. 5).

In the examples in FIG. 4, and FIG. 5, a hole is made in advance in the metallic cover 1, since it is bent in the shape of "L" in the direction of the side face of the gasket portion. However, in the case where no metallic cover exists in this portion (no "L" shaped metallic cover), there is no need to make a hole in the metallic cover. In the foregoing examples, the remaining runner portion does not exert any adverse influence on the gasket function.

It is suitable to make at least one or two holes in the metallic cover in accordance with the shape, size and the like of the gasket portion.

It is possible to firmly hold the gasket portion, and thus prevent it from remaining in a mold during molding or peeling off the metallic cover during molding or use, by coating the metallic cover in advance with an adhesive such as an adhesive of thermoplastic resin including phenolic resin, vinylic resin, etc. Nevertheless, it is possible to produce a gasket integrated with a cover wherein the gasket portion is firmly held without coating the metallic cover in advance with an adhesive or the like, by the use of the thermoplastic elastomer composition, especially that which comprises a modified polyolefinic resin, which is surpassingly excellent in adhesivity to a metal, and which will be described hereinafter as a proposal by the present inventors.

The metallic sheet to be used in the process for producing the gasket integrated with a cover according to the present invention is not specifically limited, but may be properly optionally selected for use according to the purpose of use of the cover from cold rolled steel sheets, galvanized steel sheets, aluminum/zinc alloy plated steel sheets, stainless steel sheets, aluminum sheets, aluminum alloy sheets, magnesium sheets and magnesium alloy sheets, non-electrolytic nickel plated aluminum sheets and the like. Injection molded magnesium sheets are also usable. There is preferably usable a metallic sheet which is treated with non-electrolytic nickel plating for its being excellent in corrosion resistance. As a method for non-electrolytic nickel plating, there is usable any of well known methods that have heretofore been applied to metallic raw materials, for instance, a method which comprises immersing a metallic sheet to be treated in a non-electrolytic nickel plating bath comprising an aqueous solution at a pH of approximately 4.0 to 5.0 and at a temperature of approximately 85 to 95° C. which contains nickel sulfate, sodium hypochlolite, lactic acid, propionic acid and the like each in a proper proportion.

The thickness of the metallic sheet to to be used in the process for producing the gasket integrated with a cover according to the present invention, is properly optionally selected for use according to the purpose of use of the cover body, and is in the range of usually from 0.3 to 1.0 mm, preferably from 0.4 to 0.6 mm.

The thermoplastic elastomer to be used in the process for producing the gasket integrated with a cover according to the present invention is not specifically limited, but may be properly optionally selected for use from the thermoplastic elastomer of any of styrene base, olefin base, urethane base, ester base and the like.

The present inventors have previously proposed a thermoplastic elastomer composition having excellent rubber elasticity, favorable oil maintainability, low hardness, excellent seating property and low compression set for use as a gasket material, comprising 100 parts by weight of a (a6) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 150,000, in which the at least one polymer block composed principally of a vinyl aromatic compound is polystyrene, and in which the content by weight of the polystyrene moiety that is contained in the hydrogenated block copolymer is in the range of 20 to 40%; 50 to 200 parts by weight of a (b6) non-aromatic rubber-softening agent having a kinematic viscosity at 40° C. of at least 300mm$^2$s$^{-1}$; and 5 to 50 parts by weight of a (c6) polyolefinic resin composed principally of polypropylene, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%. The thermoplastic elastomer composition just stated is well suited for use in the process for producing the gasket integrated with a cover according to the present invention.

In addition, the present inventors have also proposed a resin composition which comprises a thermoplastic elastomer composition having improved adhesivity between a metal and the above-mentioned thermoplastic elastomer composition, comprising 100 parts by weight of a (a7) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene, and in which the content by weight of the polystyrene moiety that is contained in the hydrogenated block copolymer is in the range of 20 to 40%; 100 to 200 parts by weight of a (b7) non-aromatic rubber-softening agent having a kinematic viscosity at 40° C. of at least 300mm$^2$s$^{-1}$ and 10 to 50 parts by weight of a (c7) modified polyolefinic resin, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%. The thermoplastic elastomer composition just stated is well suited for use in the process for producing the gasket integrated with a cover according to the present invention.

The working effects of the present invention are summarized as follows:

The resin composition according to the present invention is endowed with such performances as excellent rubber elasticity, good oil maintainability, low hardness, low compression set and the like and with excellent adhesivity to a metal and besides, makes it possible to produce therefrom, a gasket material, particularly a gasket integrated with a metal by means of ordinary injection molding without intricate steps such as applying in advance, coating of an adhesive to the surface of a metallic part or installing a through hole or groove.

Moreover, the thermoplastic elastomer composition according to the present invention is endowed with such performances as excellent rubber elasticity, good oil maintainability, low hardness, low compression set and the like and with excellent adhesivity to a metal and besides, makes it possible to produce therefrom, a gasket material, particularly a gasket integrated with a metal by means of ordinary injection molding without intricate steps such as applying in advance, coating of an adhesive to the surface of a metallic part or installing a through hole or groove.

In addition, the composite molded body according to the present invention is of such constitution that a metallic sheet and a thermoplastic material are integrated with each other without being subjected to a surface treatment without the use of an adhesive, is imparted with such characteristics as low moisture permeability, airtightness and dust preventability, and is well suited for use as a gasket fitted to a cover used for housing electronic equipment and the like.

Further, the process for producing the composite molded body of a resin and metal according to the present invention makes it possible to produce a composite molded body of a resin and metal, for instance, a gasket integrated with a cover in which the resin and metal are firmly fixed and adhered to each other. Thus, the gasket integrated with a cover is well suited for use as a gasket material for hard disc drive which is required to have enhanced dust preventability.

Furthermore, the process for producing a gasket integrated with a cover according to the present invention makes it possible to produce a gasket integrated with a cover without any restriction on the aspect of design without any impairment to gasket performance due to the loss of flatness of gasket surface. The gasket integrated with a cover thus obtained is well suited for use not only as a gasket material for hard disc drive which is required to have enhanced dust preventability, but also as an ordinary gasket material and packing material for portions and positions that are required to have airtightness.

In the following, the present invention will be described in more detail with reference to comparative examples and working examples, which however shall never limit the present invention thereto.

Evaluations were made of the physical properties in the following working examples and comparative examples by the method and procedure as described hereunder.

(1) Hardness

Hardness was measured according to JIS K6253 with a durometer of type A.

(2) Compression Set

Compression set was measured according to JIS K6262 after being allowed to stand at 70° C. under a compression ratio of 25% for 22 hours (3) Adhesivity to Metal A gasket integrated with a metal was prepared in which a gasket 12 was formed on an aluminum plate 11. Specifically, a resin molded body (gasket) which was in the form of □ measuring 1 mm in width, 1 mm in height and 15 mm×30 mm in edge length was formed on an aluminum plate by placing in advance, a rectangular aluminum plate measuring 1 mm in thickness and 25 mm×40 mm in edge length which had been subjected in advance to press working in a mold which had been subjected to a releasing treatment on the surface thereof, and injection casting a resin composition onto the surface of the aluminum plate under the conditions including an injection temperature of 200° C. and an injection cycle of 20 seconds.

Evaluations were made of the adhesivity to metal on the basis of the following criterion according to circumstance of the resin molded body at the time of mold opening (procedure of opening the mold to take out the molded body):

⊚: Resin molded body does not peel off aluminum plate at all at the time of mold opening ○: Resin molded body sometimes peels off aluminum plate at a probability of 50% or less at the time of mold opening ×: Resin molded body peels off aluminum plate or is dislocated from prescribed position at the time of mold opening

EXAMPLES 1 TO 4 AND COMPARATIVE EXAMPLES 1 AND 2

(1) Preparation of Thermoplastic Material

Samples of thermoplastic resins were prepared by sufficiently kneading each of the components at blending proportions as listed in Table 1, and evaluations were made of the physical properties of the samples.

As a result as is clearly seen from Table 1, it has been observed that the thermoplastic resins in Examples 1 to 3 indicated favorable adhesivity to a metal, but the thermoplastic resin in Example 4 indicated somewhat inferior adhesivity thereto, whereas the thermoplastic resins in Comparative Examples 1 and 2 indicated deteriorated adhesivity thereto, thus making themselves unendurable to practical applications.

TABLE 1

|  | Example Number | | | | Comp.: Comparative Comp. Example Number | |
| --- | --- | --- | --- | --- | --- | --- |
|  | 1 | 2 | 3 | 4 | 1 | 2 |
| RESIN COMPOSITION | | | | | | |
| Blending Component | | | | | | |
| A-1 (parts by weight) | 100 | 100 | 100 | 100 | 100 | — |
| A-2 (parts by weight) | — | — | — | — | — | 100 |
| B-1 (parts by weight) | 150 | 150 | 150 | 150 | 150 | 150 |
| C-1 (parts by weight) | 15 | 25 | 45 | — | — | — |
| C-2 (parts by weight) | — | — | — | 45 | — | — |
| C-3 (parts by weight) | — | — | — | — | 45 | — |
| Physical Properties | | | | | | |
| Hardness (JIS A) | 20 | 30 | 40 | 40 | 45 | 40 |
| Compression set (%) | 30 | 30 | 45 | 45 | 45 | 60 |
| EVALUATION RESULTS | | | | | | |
| Adhesivity to metal | ⊚ | ⊚ | ⊚ | ○ | X | ⊚ |

{Remarks}
A-1: SEPS having a weight average molecular weight of 350,000 and a polystyrene content of at least 30% by weight
A-2: SEPS having a weight average molecular weight of 150,000 and a polystyrene content of at least 30% by weight
B-1: paraffinic oil having a kinematic viscosity at 40° C. of 380 $mm^2s^{-1}$
C-1: maleic anhydride-modified polypropylene with a modification rate of 5% by weight
C-2: maleic anhydride-modified polypropylene with a modification rate of 0.5% by weight
C-3: unmodified polypropylene

EXAMPLES 5 TO 7 AND COMPARATIVE EXAMPLES 3 AND 5

(1) Preparation of Thermoplastic Material

Samples of thermoplastic resins were prepared by sufficiently kneading each of the components at blending proportions as listed in Table 2, and evaluations were made of the physical properties of the samples.

As a result, as is clearly seen from Table 2, it has been observed that the thermoplastic resins in Examples 5 to 7 indicated favorable adhesivity to a metal, but on the contrary, the thermoplastic resins in Comparative Examples 3 and 4 indicated poor adhesivity to a metal, and that in Comparative Example 5 indicated unreasonably high compression set, thus making itself unendurable to practical applications.

TABLE 2

|  | Example Number ||| Comp. Example Number |||
|---|---|---|---|---|---|---|
|  | 5 | 6 | 7 | 3 | 4 | 5 |
| RESIN COMPOSITION | | | | | | |
| Blending Component | | | | | | |
| (a) (parts by weight) | 100 | 100 | 100 | 100 | 100 | — |
| (b) (parts by weight) | 150 | 150 | 150 | 150 | 150 | 150 |
| (c) (parts by weight) | 15 | 25 | 25 | — | — | 100 |
| (d) (parts by weight) | — | — | 5 | 5 | — | — |
| Physical Properties | | | | | | |
| Hardness (JIS A) | 20 | 20 | 35 | 35 | 20 | 20 |
| Compression set (%) | 30 | 40 | 40 | 45 | 45 | 70 |
| EVALUATION RESULTS | | | | | | |
| Adhesivity to metal | ⊚ | ⊚ | ⊚ | X | X | ⊚ |

{Remarks}
(a): SEPS having a weight average molecular weight of 350,000 and a polystyrene content of 30% by weight (trade name of Septon 4077, manufactured by Kuraray Co., Ltd.)
(b): paraffinic oil having a kinematic viscosity at 40° C. of 380 mm$^2$s$^{-1}$ and a weight average molecular weight of 750 (trade name of Diana Process Oil PW380, manufactured by Idemitsu Kosan Co., Ltd.)
(c): maleic anhydride-modified SEBS (trade name of Tuftec M1943, manufactured by Asahi Chemical Industry Co. Ltd.)
(d): unmodified polypropylene (trade name of PP-BC05B, manufactured by Japan Polychemicals Co., Ltd.)

EXAMPLE 8

The styrenic thermoplastic elastomer composition which consisted of the blending components as stated hereunder, and had a JIS-A hardness of 30 degrees and a compression set of 30% was insert molded by the use of an injection molding machine onto a laminated sheet measuring 5 cm×5 cm in size wherein an aluminum sheet having a thickness of 1 mm had been laminated with a polyethylene sheet having a thickness of 50 μm and a JIS-A hardness of 90 degrees so as to form a layer of the aforesaid composition measuring 1 mm in width and 1 mm in height on the polyethylene surface along the inner periphery of a square each edge of which was inwardly 5mm distant from the outer periphery of the opposite edge of the laminated sheet.
{The Blending Components}
(1) SEPS having a number average molecular weight of 300,000 and a polystyrene content of 30% by weight (trade name of Septon, manufactured by Kuraray Co., Ltd.); 100parts by weight
(2): paraffinic oil having a kinematic viscosity at 40° C. of 380mm$^2$s$^{-1}$ and a weight average molecular weight of 750 (trade name of Diana Process Oil PW380, manufactured by Idemitsu Kosan Co.,Ltd.); 150 parts by weight
(3): polypropylene (trade name of Achieve, manufactured by Exxon Chemical Japan Ltd.); 25 parts by weight The composite molded body prepared in the above-mentioned manner was placed as the cover onto a box which was equipped in advance with a nozzle so as to enable pressurizing, and which measured 5 cm×5 cm in size and 1 cm in depth. Subsequently, to carry out airtightness test, the inside of the box equipped with the cover was pressurized to 391 MPa, and a measurement was made of the lapse of time until the inside pressure dropped to 195.5 MPa. The result was 60 seconds or longer.

EXAMPLE 9

The procedure in Example 8 was repeated to prepare a composite molded body and carry out the airtightness test except that use was made of an olefinic thermoplastic elastomer composition having a JIS-A hardness of 50 degrees and a compression set of 40% (trade name of Suntplene, manufactured by AES Co., Ltd.) in place of the thermoplastic elastomer composition having the blending components (1),(2) and (3). As a result, the lapse of time until the inside pressure dropped to 195.5 MPa was 100 seconds.

EXAMPLE 10

The procedure in Example 8 was repeated to prepare a composite molded body and carry out the airtightness test except that use was made of a laminated sheet measuring 5 cm×5 cm in size wherein a stainless steel sheet having a thickness of 0.5 mm had been laminated with polyethylene sheet having a thickness of 20 μm and a JIS-A hardness of 90 degrees, and that use was made of a urethanic thermoplastic elastomer composition having a JIS-A hardness of 65 degrees and a compression set of 50% (trade name of Miraclon U, manufactured by Kuraray Co., Ltd.), in place of the thermoplastic elastomer composition having the blending components (1),(2) and (3). As a result, the lapse of time until the inside pressure dropped to 195.5 MPa was 50 seconds.

COMPARATIVE EXAMPLE 6

Polyurethane foam having a thickness of 1 mm was punched into the form of frame to prepare a layer same as that of the thermoplastic elastomer composition in Example 8. The resultant layer was fixed to an aluminum sheet having a thickness of 1 mm with a double coated tape, and was subjected to the airtightness test in the same manner as in Examples 8 to 10. As a result, the lapse of time until the inside pressure dropped to 195.5 MPa was as short as 20 seconds, which elucidated inferior sealing property as compared with at least 50 seconds in Examples 8 to 10.

In the following, detailed description will be given of the chemical composition and physical property of the thermoplastic elastomer composition that was used in Examples 11 to 17, and the methods for a corona treatment and a vacuum plasma treatment used therein:

{Chemical Composition and Physical Property of the Thermoplastic Elastomer Composition}

The composition which was obtained by sufficiently kneading 100 parts by weight of SEPS having a weight average molecular weight of 350,000 and a polystyrene content of at least 30% by weight; 150 parts by weight of paraffinic oil having a kinematic viscosity at 40° C. of 380mm$^2$s$^{-1}$; and 25 parts by weight of maleic anhydride-modified polypropylene with a modification rate of 5% by weight, and which had a hardness as measured in accordance with JIS K6253 with a durometer of type A being 25 degrees and a compression set as measured in accordance with JIS K6262 after being allowed to stand at 70° C. under a compression ratio of 25% for 22 hours being 30%

{Method for a Corona Treatment}

Equipment used; Corona Generator Model HV05-2 (manufactured by TANTEC Corporation)
   Electrode; electrode of 80 mm in width
   Atmosphere; atmosphere of open air
   Electric power; 100 W
   Period of time; 10 seconds {Method for a Vacuum Plasma Treatment}

Equipment used; glass made vacuum apparatus and high frequency generator
   Atmosphere; atmosphere of gas at 67 to 130 Pa
   Gas used; argon, oxygen, nitrogen, CF$_4$/oxygen, ethylene
   Electric power; 100 W
   Frequency; 13.56 MHz
   Period of time; 300 seconds

EXAMPLE 11

As illustrated in FIG. 1, a gasket integrated with a metal was prepared in which a resin molded body (gasket) 2 in the form of □ measuring 1 mm in width, 1 mm in height and 15 mm×30 mm in edge length was formed on a metallic part.

Specifically, by using as the metallic part, a rectangular aluminum plate measuring 1 mm in thickness and 25 mm×40 mm in edge length which had been obtained by press working, whole surface of the aluminum plate on which the gasket was to be formed was subjected to a corona discharge treatment.

Subsequently, the above-mentioned gasket was obtained by placing the aluminum plate in a mold which had been subjected to releasing treatment on its surface immediately after the corona discharge treatment, and injection casting a thermoplastic elastomer composition onto the surface of the aluminum plate under the conditions including an injection temperature of 200° C. and an injection cycle (period of time from injection to mold opening) of 20 seconds.

During the foregoing injection procedure, there was no such trouble or accident at all that the resin molded body peeled off the aluminum plate or was dislocated from a prescribed position at the time of mold opening.

EXAMPLE 12

The procedure in Example 11 was repeated to prepare a composite molded body and carry out peeling/dislocation test except that stainless steel was used as the material for the metallic part in place of the aluminum.

During the injection procedure, there was no such trouble or accident at all that the resin molded body peeled off the stainless steel plate or was dislocated from a prescribed position at the time of mold opening.

EXAMPLE 13

The procedure in Example 11 was repeated to prepare a composite molded body and carry out peeling/dislocation test except that the corona discharge treatment was replaced with a vacuum plasma treatment in argon gas. During the injection procedure, there was no such trouble or accident at all that the resin molded body peeled off the aluminum plate or was dislocated from a prescribed position at the time of mold opening.

EXAMPLE 14

The procedure in Example 11 was repeated to prepare a composite molded body and carry out peeling/dislocation test except that stainless steel was used as the material for the metallic part in place of the aluminum, and that the corona discharge treatment was replaced with a vacuum plasma treatment in oxygen gas. During the injection procedure, there was no such trouble or accident at all that the resin molded body peeled off the stainless steel plate or was dislocated from a prescribed position at the time of mold opening.

EXAMPLE 15

The procedure in Example 11 was repeated to prepare a composite molded body and carry out peeling/dislocation test except that the corona discharge treatment was replaced with a vacuum plasma treatment in CF$_4$/oxygen gas. During the injection procedure, there was no such trouble or accident at all that the resin molded body peeled off the aluminum plate or was dislocated from a prescribed position at the time of mold opening.

EXAMPLE 16

The procedure in Example 11 was repeated to prepare a composite molded body and carry out peeling/dislocation test except that stainless steel was used as the material for the metallic part in place of the aluminum, and that the corona discharge treatment was replaced with a vacuum plasma treatment in nitrogen gas. During the injection procedure there was no such trouble or accident at all that the resin molded body peeled off the stainless steel plate or was dislocated from a prescribed position at the time of mold opening.

EXAMPLE 17

The procedure in Example 11 was repeated to prepare a composite molded body and carry out peeling/dislocation test except that the corona discharge treatment was replaced with a vacuum plasma treatment in ethylene gas. During the injection procedure, there was no such trouble or accident at all that the resin molded body peeled off the aluminum plate or was dislocated from a prescribed position at the time of mold opening.

The thermoplastic elastomer composition which was used in the following examples and comparative examples was that which was obtained by sufficiently kneading 100 parts by weight of SEPS having a weight average molecular weight of 350,000 and a polystyrene content of at least 30% by weight; 150 parts by weight of paraffinic oil having a kinematic viscosity at 40° C. of 380mm$^2$s$^{-1}$; and 25 parts by weight of maleic anhydride-modified polypropylene with a modification rate of 5% by weight, and which had a hardness as measured in accordance with JIS K6253 with a durometer of type A being 30 degrees and a compression set as measured in accordance with JIS K6262 after being allowed to stand at 70C under a compression ratio of 25% for 22 hours being 30%.

EXAMPLE 18

By the method as described with reference to FIGS. 2 and 3 in which the thermoplastic elastomer composition was injected from the direction towards the reverse face of the gasket portion, that is, the face in contact with the metallic cover, there was prepared a gasket integrated with a cover made of a metal (aluminum) the shape of which is illustrated in FIGS. 2 and 3. The resultant gasket portion, which was in the form of □ measuring 1 mm in width, 1 mm in height and 50 mm in edge length, was formed on the metallic cover under the conditions including an injection temperature of 200° C. and an injection cycle (period of time from injection to mold opening) of 20 seconds.

The gasket portion in the objective gasket integrated with the cover was firmly fixed and adhered to the metallic cover without peeling off and besides, maintained markedly excellent flatness on the butt contact surface at the time of mold opening (procedure of opening the mold to withdraw the molded body) in the injection procedure.

EXAMPLE 19

By the method as described with reference to FIGS. 4 and 5 in which the thermoplastic elastomer composition was injected from the direction towards the side face of the gasket portion, there was prepared a gasket integrated with a cover made of a metal (aluminum) the shape of which is illustrated in FIGS. 4 and 5. The injection molding conditions, and the size, dimension and shape of the resultant gasket portion were each same as those in Example 18.

The gasket portion in the objective gasket integrated with the cover was firmly fixed and adhered to the metallic cover without peeling off and besides, maintained markedly excellent flatness on the butt contact surface at the time of mold opening (procedure of opening the mold to withdraw the molded body) in the injection procedure.

COMPARATIVE EXAMPLE 7

The procedure in Example 18 was repeated to prepare the gasket integrated with the cover same as that in Example 18 except that the thermoplastic elastomer composition was injected from the direction towards the butt contact surface of the gasket portion (in FIG. 3 the direction from left to right) instead of the direction towards the reverse face thereof.

The gasket portion in the objective gasket integrated with the cover was firmly fixed and adhered to the metallic cover without peeling off at the time of mold opening (procedure of opening the mold to withdraw the molded body) in the injection procedure, but it was impossible to completely remove the runner portion on the butt contact surface, thus resulting in impaired flatness of the butt contact surface.

What is claimed is:

1. A resin composition which comprises a thermoplastic elastomer composition comprising 100 parts by weight of a (a1) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 300,000, in which the at least one polymer block composed principally of a vinyl aromatic compound is polystyrene, and in which the content by weight of the polystyrene moiety that is contained in the hydrogenated block copolymer is in the range of 20 to 40%; 100 to 200 parts by weight of a (b1) non-aromatic rubber softening agent having a kinematic viscosity at 40° C. of at least 300 mm$^2$s$^{-1}$ and 10 to 50 parts by weight of a (c1) modified polyolefinic resin, said resin composition having a hardness as measured in accordance with JIS K6253 with durometer of type A being at most 50 degrees and a compression set as measured in accordance with JIS K6262 after being allowed to stand at 70° C. under a compression ratio of 25% for 22 hours being at most 50%, wherein the (c1) modified polyolefinic resin is that which has a functional group having an absorption band at a wave number in the range of 1500 to 2000 cm$^{-1}$ in the infrared absorption spectrum thereof.

2. The resin composition according to claim 1, wherein the (c1) modified polyolefinic resin is a resin which is produced by modifying a polyolefinic resin composed principally of polypropylene with an unsaturated carboxylic acid or a derivative thereof.

3. The resin composition according to claim 2, wherein the unsaturated carboxylic acid is maleic anhydride.

4. A gasket material which comprises the resin composition as set forth in claim 1.

5. A gasket integrated with a metal, which is formed by molding the gasket material as set forth in claim 4.

6. A hard disc gasket which comprises the gasket integrated with a metal as set forth in claim 5.

7. A thermoplastic elastomer composition comprising 100 parts by weight of a (a2) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 300,000, in which the at least one polymer block composed principally of a vinyl aromatic compound is polystyrene and in which the content by weight of the polystyrene moiety that is contained in the hydrogenated block copolymer is in the range of 20 to 40%; 100 to 200 parts by weight of a (b2) non-aromatic rubber softening agent having a kinematic viscosity at 40° C. of at least 300 mm$^2$s$^{-1}$; and 10 to 50 parts by weight of a (c2) modified hydrogenated block copolymer obtained by hydrogenating a block copolymer in which a functional group is imparted to a block copolymer consisting essentially of at least one polymer block composed principally of a vinyl aromatic compound and at least one polymer block composed principally of a conjugated diene compound; and 0 to 20 parts by weight of a (d2) compound composed principally of a crystalline polyolefin, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%, wherein the (c2) modified hydrogenated block copolymer is that which has a functional group having an absorption band at a wave number in the range of 1500 to 2000 cm$^{-1}$ in the infrared absorption spectrum thereof.

8. The thermoplastic elastomer composition according to claim 7, wherein the (c2) modified hydrogenated block copolymer is that which is modified with an unsaturated carboxylic acid or a derivative thereof.

9. The thermoplastic elastomer composition according to claim 8, wherein the unsaturated carboxylic acid is maleic anhydride.

10. A gasket material which comprises the thermoplastic elastomer composition as set forth in claim 7.

11. A gasket, comprising the gasket material of claim 10, wherein said gasket material is integrated with a metallic cover or a metallic frame.

12. A gasket for a hard disc apparatus, comprising the gasket material of claim 10, wherein said gasket material is integrated with a metallic cover or a metallic frame.

13. A composite molded body, prepared by a process comprising integrating through thermally fusing adhesion, a metallic sheet laminated with a thermoplastic resin having a hardness as measured in accordance with JIS 6253 with a durometer of type A of at least 50 degrees; and a thermoplastic elastomer composition comprising said resin composition according to claim 7.

14. The composite molded body according to claim 13, wherein the thermoplastic elastomer composition comprises 100 parts by weight of a (a3) hydrogenated block copolymer which is obtained by hydrogenating a block copolymer consisting essentially of polystyrene block and at least one polymer block composed principally of a conjugated diene compound, in which the content by weight of the polystyrene moiety that is contained in the hydrogenated block copolymer is in the range of 20 to 40%; 100 to 500 parts by weight of a (b3) non-aromatic softening agent having a kinematic viscosity at 40° C. of at least 300 $mm^2s^{-1}$; and 5 to 100 parts by weight of a (c3) polyolefinic hydrocarbon resin.

15. A gasket fitted to a cover with the use of the composite molded body according to claim 13.

16. The gasket fitted to a cover according to claim 15, comprising a metal surface side of said metallic sheet, and wherein said metal surface side of said metallic sheet forms a sealing surface.

17. The composite molded body according to claim 13, wherein the thermoplastic resin is at least one species selected from the group consisting of polyethylene, polypropylene and polystyrene.

18. The composite molded body according to claim 13, wherein the thermoplastic resin laminate has a thickness of at most 100 μm.

19. The composite molded body according to claim 13, wherein the thermoplastic elastomer composition comprises at least one species selected from the group consisting of styrenic thermoplastic elastomers, olefinic thermoplastic elastomers and urethanic thermoplastic elastomers.

20. A process for producing the composite molded body as set forth in claim 13, comprising placing a metallic sheet which has a prescribed shape and which is laminated on at least one side thereof with a thermoplastic resin, and injection molding a thermoplastic elastomer composition onto at least one part of the surface laminated therewith to integrate the metallic sheet and the thermoplastic elastomer composition.

21. A gasket, comprising a gasket material integrated with a metal, which is formed by molding said gasket material,
wherein said gasket material comprises a resin composition, and
wherein said resin composition comprises a thermoplastic elastomer composition comprising 100 parts by weight of a (a1) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene, and in which the content by weight of the polystyrene moiety that is contained in the hydrogenated block copolymer is in the range of 20 to 40%; 100 to 200 parts by weight of a (bi) non-aromatic rubber-softening agent having a kinematic viscosity at 40° C. of at least 300 $mm^2s^{-1}$; and 10 to 50 parts by weight of a (c1) modified polyolefinic resin, said resin composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%.

22. A hard disc gasket, which comprises the gasket integrated with a metal as set forth in claim 4.

23. A gasket, comprising a gasket material integrated with a metal, which is formed by molding said gasket material into a gasket integrated with a metallic cover or a metallic frame,
wherein said gasket material comprises a thermoplastic elastomer composition, and
wherein said thermoplastic elastomer composition comprises 100 parts by weight of a (a2) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene and in which the content by weight of the polystyrene moiety that is contained in the hydrogenated block copolymer is in the range of 20 to 40%; 100 to 200 parts by weight of a (b2) non-aromatic rubber-softening agent having a kinematic viscosity at 40° C. of at least 300 $mm^2s^{-1}$; 10 to 50 parts by weight of a (c2) modified hydrogenated block copolymer obtained by hydrogenating a block copolymer in which a functional group is imparted to a block copolymer consisting essentially of at least one polymer block composed principally of a vinyl aromatic compound and at least one polymer block composed principally of a conjugated diene compound; and 0 to 20 parts by weight of a (d2) compound composed principally of a crystalline polyolefin, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%.

24. The gasket according to claim 23, which is a hard disc apparatus.

25. A process for producing a gasket integrated with a cover, comprising placing a metallic cover in a mold, and injecting a gasket material composed of a thermoplastic elastomer composition onto the surface of said cover so as to form a gasket portion, wherein the thermoplastic elastomer composition is injection cast from a direction different from the direction towards a butt contact surface on the gasket portion upon the use thereof, and wherein the thermoplastic elastomer composition comprises 100 parts by weight of a (a6) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 150,000, in which the at least one polymer block composed principally of a vinyl aromatic compound is polystyrene, and in which the content by weight of the polystyrene moiety that is contained in the hydrogenated block copolymer is in the range of 20 to 40%; 50 to 200 parts by weight of a (b6) non-aromatic rubber-softening agent having a kinematic viscosity at 40° C. of at least 300 $mm^2s^{-1}$; and 5 to 50 parts by weight of a (c6) polyolefinic resin composed principally of polypropylene, said thermoplastic elastomer composition having a hardness as measured in accordance with JIS K6253 with durometer of type A being at most 50 degrees and a compression set measured in accordance with JIS K6262 after being allowed to stand at 70° C. under a compression ratio of 25% for 22 hours being at most 50%.

26. A process for producing a gasket integrated with a cover, comprising placing a metallic cover in a mold, and injecting a gasket material composed of a thermoplastic elastomer composition onto the surface of said cover so as to form a gasket portion, wherein the thermoplastic elastomer composition is injection cast from a direction different from the direction towards a butt contact surface on the gasket portion upon the use thereof, and wherein the thermoplastic elastomer composition comprises 100 parts by weight of a (a7) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene, and in which the content by weight of the polystyrene moiety that is contained in the hydrogenated block copolymer is in the range of 20 to 40%; 100 to 200 parts by weight of a (b7) non-aromatic rubber-softening agent having a kinematic viscosity at 40° C. of at least 300 $mm^2s^{-1}$; and 10 to 50 parts by weight of a (c7) modified polyolefinic resin, said thermoplastic elastomer composition having a hardness as measured in accordance with JIS K6253 with durometer of type A being at most 50 degrees and a compression set as measured in accordance with JIS K6262 after being allowed to stand at 70 ° C. under a compression ratio of 25% for 22 hours being at most 50%.

27. The process for producing a composite molded body of a resin and metal according to claim 26, wherein the (c7) modified polyolefinic resin is a polyolefinic resin composed principally of polyethylene or polypropylene and contains an unsaturated carboxylic acid or a derivative thereof or acrylic acid or a derivative thereof.

28. The process for producing a composite molded body of a resin and metal according to claim 27, wherein the unsaturated carboxylic acid is maleic anhydride.

29. A process for producing a composite molded body of a resin and metal which comprises subjecting part or all of the surface of a metallic part that comes into contact with a resin portion to a corona treatment or a plasma treatment, thereafter placing the metallic part thus treated in a mold, and then injecting a thermoplastic elastomer composition onto the surfaces of the metallic part placed in the mold to form the resin portion.

30. The process for producing a composite molded body of a resin and metal according to claim 29, wherein the thermoplastic elastomer composition comprises 100 parts by weight of a (a4) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 150,000, in which the at least one polymer block composed principally of a vinyl aromatic compound is polystyrene and in which the content by weight of the polystyrene moiety that is contained in the hydrogenated block copolymer is in the range of 20 to 40%; 50 to 200 parts by weight of a (b4) non-aromatic rubber-softening agent having a kinematic viscosity at 40° C. of at least 300 $mm^2s^{-1}$; and 5 to 50 parts by weight of a (c4) polyolefinic resin composed principally of polypropylene, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%.

31. The process for producing a composite molded body of a resin and metal according to claim 29, wherein the thermoplastic elastomer composition comprises 100 parts by weight of a (a5) hydrogenated block copolymer which is obtained by hydrogenating a block copolymer consisting essentially of at least one polymer block composed principally of a vinyl aromatic compound and at least one polymer block composed principally of a conjugated diene compound, which has a weight average molecular weight of at least 200,000, in which the at least one polymer block composed principally of a vinyl aromatic compound is polystyrene and in which the content by weight of the polystyrene moiety that is contained in the hydrogenated block copolymer is in the range of 20 to 40%; 100 to 200 parts by weight of a (b5) non-aromatic rubber-softening agent having a kinematic viscosity at 40° C. of at least 300 $mm^2s^{-1}$; and 10 to 50 parts by weight of a (c5) modified polyolefinic resin, said thermoplastic elastomer composition having a hardness as measured in accordance with JIS K6253 with a durometer of type A being at most 50 degrees and a compression set as measured in accordance with JIS K6262 after being allowed to stand at 70° C. under a compression ratio of 25% for 22 hours being at most 50%.

32. The process for producing a composite molded body of a resin and metal according to claim 31, wherein the (c5) modified polyolefinic resin is a polyolefinic resin composed principally of polyethylene or polypropylene, and contains an unsaturated carboxylic acid or a derivative thereof or acrylic acid or a derivative thereof.

33. The process for producing a composite molded body of a resin and metal according to claim 32, wherein the unsaturated carboxylic acid is maleic anhydride.

34. A composite molded body of a resin and metal, characterized by being produced by the process as set forth in claim 29.

35. The composite molded body of a resin and metal according to claim 34, which is a gasket integrated with a cover.

36. A process for producing a gasket integrated with a cover, comprising placing a metallic cover in a mold, and injecting a gasket material composed of a thermoplastic elastomer composition onto the surface of said cover so as to form a gasket portion, wherein the thermoplastic elastomer composition is injection cast from a direction different from the direction towards a butt contact surface on the gasket portion upon the use thereof, and wherein the thermoplastic elastomer composition is injection cast onto the surface of the cover from the direction towards the rear face of the gasket portion through at least one hole bored in advance in the metallic cover.

37. A process for producing a gasket integrated with a cover, comprising placing a metallic cover in a mold, and injecting a gasket material composed of a thermoplastic elastomer composition onto the surface of said cover so as to form a gasket portion, wherein the thermoplastic elastomer composition is injection cast from a direction different from the direction towards a butt contact surface on the gasket portion upon the use thereof, and wherein the thermoplastic elastomer composition is injection cast onto the surface of the cover from the direction towards a side face of the gasket portion.

* * * * *